United States Patent
Axmon et al.

(10) Patent No.: US 12,185,289 B2
(45) Date of Patent: Dec. 31, 2024

(54) ADAPTING OPERATIONS IN FLEXIBLE ALLOCATION SLOTS PARTIALLY OVERLAPPING WITH MEASUREMENT GAPS

(71) Applicant: Telefonaktiebolaget LM Ericsson (publ), Stockholm (SE)

(72) Inventors: Joakim Axmon, Limhamn (SE); Muhammad Kazmi, Sundbyberg (SE); Christopher Callender, Kinross (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 732 days.

(21) Appl. No.: 17/280,995

(22) PCT Filed: Sep. 24, 2019

(86) PCT No.: PCT/EP2019/075650
§ 371 (c)(1),
(2) Date: Mar. 29, 2021

(87) PCT Pub. No.: WO2020/064698
PCT Pub. Date: Apr. 2, 2020

(65) Prior Publication Data
US 2021/0345323 A1    Nov. 4, 2021

Related U.S. Application Data

(60) Provisional application No. 62/738,663, filed on Sep. 28, 2018.

(51) Int. Cl.
*H04W 72/04* (2023.01)
*H04W 72/0446* (2023.01)

(52) U.S. Cl.
CPC ............................. *H04W 72/0446* (2013.01)

(58) Field of Classification Search
CPC ............. H04W 72/0446; H04W 72/12; H04W 36/0088; H04L 5/0076; H04L 5/0078
See application file for complete search history.

(56) References Cited

U.S. PATENT DOCUMENTS 10,798,672 B2 * 10/2020 Cui ........................ H04W 24/10
2011/0205928 A1 * 8/2011 Pelletier ............ H04W 52/0216
370/252

(Continued)

FOREIGN PATENT DOCUMENTS

CN    102150452 A    8/2011
CN    102187611 A    9/2011

(Continued)

OTHER PUBLICATIONS

Author Unknown, "Technical Specification Group Radio Access Network; NR; Requirements for support of radio resource management (Release 15)," Technical Specification 38.133, Version 15.2.0, 3GPP Organizational Partners, Jun. 2018, 79 pages.

(Continued)

*Primary Examiner* — Hoang-Chuong Q Vu
(74) *Attorney, Agent, or Firm* — Weisberg I.P. Law, P.A.

(57) ABSTRACT

Systems and methods are disclosed herein for operational tasks to be performed in slots that are partially overlapped by measurement gaps in a wireless communication system. Embodiments of a method performed by a wireless device and corresponding embodiments of a wireless device are disclosed. In some embodiments, a method performed by a wireless device for performing scheduled communications operations for a serving cell comprises determining a communication slot that is partially overlapped by a measurement gap, the communication slot being associated with a serving cell of the wireless device. The method further comprises identifying a scheduled operational task which can be carried out in a non-overlapped portion of the (Continued)

communication slot, the non-overlapped portion of the communication slot being a portion of the communication slot not overlapped by the measurement gap. The method further comprises performing the scheduled operational task in the non-overlapped portion of the communication slot.

12 Claims, 16 Drawing Sheets

(56) References Cited

U.S. PATENT DOCUMENTS

| | | | | |
|---|---|---|---|---|
| 2012/0164948 | A1* | 6/2012 | Narasimha | H04L 1/188 |
| | | | | 455/63.1 |
| 2015/0117287 | A1* | 4/2015 | Kim | H04W 76/15 |
| | | | | 370/311 |
| 2016/0119820 | A1 | 4/2016 | Lin et al. | |
| 2016/0295583 | A1* | 10/2016 | Kazmi | H04W 76/15 |
| 2019/0200396 | A1* | 6/2019 | Agiwal | H04W 72/23 |
| 2019/0246306 | A1* | 8/2019 | Yang | H04L 27/26 |
| 2020/0314678 | A1* | 10/2020 | Lee | H04W 72/12 |
| 2021/0051584 | A1* | 2/2021 | Cheng | H04W 72/21 |
| 2021/0127391 | A1* | 4/2021 | Zhang | H04W 24/10 |
| 2021/0409173 | A1* | 12/2021 | Chatterjee | H04L 1/1812 |
| 2022/0046455 | A1* | 2/2022 | Takada | H04W 36/0088 |
| 2022/0052828 | A1* | 2/2022 | Yiu | H04W 76/28 |
| 2023/0164800 | A1* | 5/2023 | Khoshnevisan | H04W 72/1268 |
| | | | | 370/329 |

FOREIGN PATENT DOCUMENTS

| | | |
|---|---|---|
| CN | 102356658 A | 2/2012 |
| CN | 102356659 A | 2/2012 |
| CN | 102907134 A | 1/2013 |

OTHER PUBLICATIONS

Author Unknown, "Technical Specification Group Radio Access Network; NR; Physical channels and modulation," Technical Specification 38.211, Version 15.3.0, 3GPP Organizational Partners, Sep. 2018, 96 pages.

Ericsson, "R4-1813427: On UE behaviour before and after measurement gap," 3GPP TSG RAN WG4 Meeting #88bis, Oct. 8-12, 2018, Chengdu, China, 3 pages.

Ericsson, "R4-1813428: DraftCR 38.133 UE behaviour before and after measurement gap," Change Request, 3GPP TSG-RAN WG4 Meeting #88bis, Oct. 8-12, 2018, Chengdu, China, 8 pages.

LG Electronics, "R4-1810220: Discussion on UE behavior in the slot immediately before/after measurement gap," 3GPP TSG-RAN WG4#88 Meeting, Aug. 20-24, 2018, Gothenburg, Sweden, 9 pages.

ZTE, "R4-1810742: Discussion on UL transmission after measurement gap," 3GPP TSG-RAN WG4 Meeting #88, Aug. 20-24, 2018, Gothenburg, Sweden, 4 pages.

ZTE, "R4-1811869: Way forward on UE behavior before or after measurement gap," 3GPP TSG-RAN WG4 Meeting #88, Gothenburg, Sweden, 9 pages.

International Search Report and Written Opinion for International Patent Application No. PCT/EP2019/075650, mailed Dec. 9, 2019, 13 pages.

Chinese Notice of Allowance and English Summary Translation dated May 28, 2024 for Application No. 201980078676.3 consisting of 4 pages.

Chinese Search Report and English machine translation dated Nov. 3, 2023 for Application No. 2019800786763, consisting of 6 pages.

* cited by examiner

ADAPTING OPERATIONS IN FLEXIBLE ALLOCATION SLOTS PARTIALLY OVERLAPPING WITH MEASUREMENT GAPS

This application is a 35 U.S.C. § 371 national phase filing of International Application No. PCT/EP2019/075650, filed Sep. 24, 2019, which claims the benefit of U.S. Provisional No. 62/738,663, filed Sep. 28, 2018, the disclosures of which are incorporated herein by reference in their entireties.

TECHNICAL FIELD

The present disclosure relates to measurement gaps in a wireless communication system and, more specifically, to adapting operations in slots that are partially overlapped by measurement gaps.

BACKGROUND

The scheduling unit in Third Generation Partnership Project (3GPP) New Radio (NR) is a Physical Resource Block (PRB), which comprises twelve (12) subcarriers in the frequency domain over a slot worth of Orthogonal Frequency-Divisional Multiplexing (OFDM) symbols in the time domain (fourteen (14) symbols for normal Cyclic Prefix (CP), twelve (12) symbols for extended CP). The normal CP length is shorter than the extended CP length in time. The subcarrier distance as well as the time duration of a slot, and hence of an OFDM symbol, is flexible, with data channels supporting Subcarrier Spacing (SCS) of 15, 30, 60, and 120 kilohertz (kHz) with associated slot durations of 1, 0.5, 0.25, and 0.125 milliseconds (ms).

Allocation of data channels (Physical Downlink Shared Channel (PDSCH) and Physical Uplink Shared Channel (PUSCH)) is flexible in NR, in that resources can be time domain allocated in OFDM symbols in different parts of the slot. So far, two different kinds of time domain allocation types are supported: TypeA and TypeB. The description below focuses on the normal CP case, although the same basic methodology also applies to the extended CP case or for any length of CP. For TypeA allocations in PDSCH, an allocation starts in one of the four first OFDM symbols (S: start symbol) and extends over at least three symbols and up to the remainder of the slot (L: length in OFDM symbols). For TypeA allocations in PUSCH, an allocation starts in the first symbol and extends over at least four symbols and up to the remainder of the slot. TypeB allocations in PDSCH can start anywhere in the first thirteen (13) OFDM symbols, and extend over two, four, or seven OFDM symbols. TypeB allocations in PUSCH may start in any of the OFDM symbols in the slot, and may extend over at least one up to a whole slot worth of OFDM symbols. Table 1 and Table 2 below summarize valid allocation start symbol (S) and length in OFDM symbols (L) combinations for PDSCH and PUSCH.

TABLE 1

PDSCH: Valid S and L combinations

| PDSCH mapping type | Normal cyclic prefix | | | Extended cyclic prefix | | |
| --- | --- | --- | --- | --- | --- | --- |
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0 , . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Posiition = 3

TABLE 2

PUSCH: Valid S and L combinations

| PUSCH mapping type | Normal cyclic prefix | | | Extended cyclic prefix | | |
| --- | --- | --- | --- | --- | --- | --- |
| | S | L | S + L | S | L | S + L |
| Type A | 0 | {4, . . . , 14} | {4, . . . , 14} | 0 | {4, . . . , 12} | {4, . . . , 12} |
| Type B | {0 , . . . , 13} | {1, . . . , 14} | {1, . . . , 14} | {0, . . . , 12} | {1, . . . , 12} | {1, . . . , 12} |

Which time domain allocation a User Equipment (UE) is to use for reception (PDSCH) or transmission (PUSCH) is specified in the Downlink Control Information (DCI) received over the Physical Downlink Control Channel (PDCCH) by an index to a list of preconfigured time domain allocations. The list of time domain allocations is preconfigured by the network via Radio Resource Control (RRC) configuration, and each UE can have an individual list. The list can be modified dynamically by the network, and hence be adapted to changing conditions. The RRC messages below show the configurable lists for PDSCH and PUSCH, respectively. The maximum number of entries in the lists is specified to be sixteen (16) each in the 3GPP Release 15 of NR.

```
PDSCH-TimeDomainResourceAllocationList ::= SEQUENCE (SIZE(1..maxNrofDL-
Allocations)) OF PDSCH-TimeDomainResourceAllocation
PDSCH-TimeDomainResourceAllocation ::= SEQUENCE {
   k0                          INTEGER(0..32)        OPTIONAL, -- Need S
   mappingType                 ENUMERATED {typeA, typeB},
   startSymbolAndLength        INTEGER (0..127)
}
PUSCH-TimeDomainResourceAllocationList ::=   SEQUENCE (SIZE(1..maxNrofUL-
Allocations)) OF PUSCH-TimeDomainResourceAllocation
PUSCH-TimeDomainResourceAllocation ::=   SEQUENCE {
   k2                          INTEGER(0..32)        OPTIONAL,   -- Need S
   mappingType                 ENUMERATED {typeA, typeB},
   startSymbolAndLength        INTEGER (0..127)
}
```

Each of the parameters k0 and k2 in the above TimeDomainResourceAllocationList is a slot offset between the slot having the DCI pointing out the TimeDomainResourceAllocation and the slot in which the allocation applies. For instance, if the DCI is received in slot n and points out a time domain resource allocation with slot offset k0=m, the provided allocation is valid for slot n+m of the concerned data channel (PDSCH or PUSCH). Time domain allocation prior notification thus ranges from the same slot the DCI is received in, and up to thirty two (32) slots later.

The parameter mappingType specifies, for each time domain resource allocation, whether the mapping is of typeA or typeB. Hence, in the set of configured time domain allocations, some may be of mapping typeA and some of mapping typeB.

Via a standardized mapping function called Start and Length Index Value (SLIV), the parameter startSymbolAndLength provides one combination of S and L, which as described above points out the start symbol and time extent of the allocation in OFDM symbols.

Resource allocation in the frequency domain is carried directly with each DCI. There are two types of allocations, type0 and type1. Frequency domain resource allocation is not central to the technical solution to be discussed here and is just mentioned here for completeness. The relevance is that the number of resource elements in a data channel allocation depends on both the number of OFDM symbols (time domain allocation) and the number of subcarriers (frequency domain allocation). If one of them is reduced, one can increase the other to maintain about the same size of the allocation.

So called front-loaded Demodulation Reference Signals (DM-RS) are used in NR. This means that the signals are transmitted in OFDM symbols at the beginning of the slot before the start of the data channel allocation for the particular UE or group of co-allocated UEs. For some allocation lengths, additional DM-RSs are provided.

For PUSCH, the reference point at which DM-RS positions are determined differ depending on allocation type. For typeA, the reference point is the start of the slot, whereas, for typeB, it is the start of the data channel time domain resource allocation. The DM-RS do not extend beyond the extent S+L of the data channel allocation. DM-RS may occur before but not after the last symbol of the data channel allocation (see, e.g., 3GPP Technical Specification (TS) 38.211 v 15.3.0).

The Physical Downlink Control Channel (PDCCH) can be flexibly allocated by means Control Resource Sets (CORESETs) associated with search spaces, where the time domain positions within a slot for the UE to monitor PDCCH are specified by the bit field monitoringSymbolsWithinSlot in the PDCCH-Config RRC information element. Search spaces associated with Cell Radio Network Temporary Identifier (C-RNTI) and Configured Scheduling Radio Network Temporary Identifier (CS-RNTI), associated with unicast transmission of PDSCH and transmission on PUSCH, can be either common or UE-specific, and thus allow different configurations for different UEs or groups thereof.

The Physical Uplink Control Channel (PUCCH) supports multiple formats (PUCCH formats 0, 1, 3, and 4). The PUCCH format is configured by the network node. The length of the PUCCH transmission is expressed in OFDM symbols, which depend on the PUCCH format.

The DM-RS is also used for control channel (e.g., for PUCCH). The number of DM-RS symbols is associated with the length of symbols used for the control channels and their format.

Slot formats in NR Time Division Duplexing (TDD) are configurable. A slot may carry symbols that are uplink resources, downlink resources, and/or flexible resources (downlink, uplink, or unused, i.e. gap). Examples of the slot format is depicted in FIGS. 1A and 1B.

In a measurement gap there is no transmission or reception, instead the UE identifies and measures on other cells during the measurement gaps. Location (time offset) of a measurement gap in NR is signaled to the UE in the granularity of one (1) subframe. In addition, the position of the measurement gap can be shifted earlier (i.e., time advanced) by 0.5 ms in Frequency Range 1 (FR1) and 0.25 ms in Frequency Range 2 (FR2) in order to better align the measurement gap to the signals to measure on the target carrier for measurements. This shift is called Measurement Gap Timing Advance (MGTA), and the impact of the MGTA differs with different SCS. FIG. 2 illustrates an exemplary impact on downlink of the shifted measurement gap in FR1. For a 15 kHz SCS used in FR1, where one subframe corresponds to one slot, the shift by MGTA by 0.5 ms means that two slots, one at the beginning and one at the end of the measurement gap, will be partially overlapped by the measurement gap. Only half the slot will remain and only partial slots remain around the measurement gap, as illustrated in FIG. 2. For a 30 kHz SCS, where one subframe corresponds to two slots, this will not be the case since the shift by MGTA 0.5 ms corresponds to a shift of a whole slot and no partially overlapped slots result. For SCS 60 kHz and 120 kHz in FR2, the shift of 0.25 ms corresponds to a number of whole slots with no partially overlapped slots as well. UEs may have capabilities to support either per UE gaps or per Frequency Range (FR) gaps.

A UE which supports only per UE gaps is configured with a single gap pattern used for measurement of both FR1 and FR2. UEs which support per FR gaps may also be configured with per UE gaps, or they may be configured with a separate gap pattern for FR1 measurements and FR2 measurements as appropriate. If per UE gaps or per FR gaps for FR1 are used, MGTA if configured is 0.5 ms, whereas for FR2 MGTA, if configured, is 0.25 ms.

Timing Advance (TA) is an advancement of the uplink transmission timing compared to the downlink reception timing used by the UE. The timing advance is to cover for twice the round trip time between the UE and the transmission point (base station), such that signals transmitted to and received by the base station from different UEs are received at the same instant of time. When needed for clarity, the term uplink-downlink TA is used for distinguishing it from MGTA. TA is controlled by the base station via Timing Advance Command (TAC) to the UE, where the base station tells the UE to increase or decrease the uplink-downlink TA to try to align all UE uplink transmissions as observed at the base station receiver to a target timing, T0.

FIG. 3 illustrates TA of uplink subframe to downlink subframe for a Frequency Division Duplexing (FDD) carrier from the UE perspective.

There currently exist certain challenges. In particular, the shifting of a measurement gap due to MGTA in case of downlink and due to both MGTA and TA in case of uplink results in new problems that need to be addressed.

SUMMARY

Systems and methods are disclosed herein for operational tasks to be performed in slots that are partially overlapped by measurement gaps in a wireless communication system. Embodiments of a method performed by a wireless device and corresponding embodiments of a wireless device are disclosed. In some embodiments, a method performed by a wireless device for performing scheduled communications operations for a serving cell comprises determining a communication slot that is partially overlapped by a measurement gap, the communication slot being associated with a serving cell of the wireless device. The method further comprises identifying a scheduled operational task which can be carried out in a non-overlapped portion of the communication slot, the non-overlapped portion of the communication slot being a portion of the communication slot not overlapped by the measurement gap. The method further comprises performing the scheduled operational task in the non-overlapped portion of the communication slot.

In some embodiments, determining the communication slot that is partially overlapped by the measurement gap comprises determining the communication slot that is partially overlapped by the measurement gap based on a measurement gap configuration of the wireless device, a subcarrier spacing of a carrier associated with the serving cell, and a measurement gap timing advance configured for the carrier associated with the serving cell.

In some embodiments, determining the communication slot that is partially overlapped by the measurement gap comprises determining, for a carrier associated with the serving cell, that there are one or more communication slots that are partially overlapped by the measurement gap based on a subcarrier spacing of the carrier associated with the serving cell and a measurement gap timing advance configured for the carrier associated with the serving cell.

In some embodiments, the method further comprises determining a size of the non-overlapped portion of the communication slot. In some embodiments, identifying the scheduled operational task which can be carried out in the non-overlapped portion of the communication slot comprises identifying the scheduled operational task which can be carried out in the non-overlapped portion of the communication slot based on the size of the non-overlapped portion of the communication slot.

In some embodiments, the method further comprises determining a location of the measurement gap. In some embodiments, determining the location of the measurement gap comprises determining a timing reference used for definition of the measurement gap on a carrier associated with the serving cell.

In some embodiments, the scheduled operational task is an operational task associated with Physical Downlink Control Channel (PDCCH) monitoring. In some embodiments, identifying the scheduled operational task which can be carried out in the non-overlapped portion of the communication slot comprises determining that there is at least one PDCCH monitoring position configured for the wireless device that fits within the non-overlapped portion of the communication slot, and determining that a reference signal needed for demodulation of PDCCH is available in the non-overlapped portion of the communication slot.

In some embodiments, the scheduled operational task is an operational task associated with Physical Downlink Shared Channel (PDSCH) reception. In some embodiments, identifying the scheduled operational task which can be carried out in the non-overlapped portion of the communication slot comprises determining that at least one time domain resource allocation for PDSCH and a reference signal needed for demodulation of PDSCH fit within the non-overlapped portion of the communication slot.

In some embodiments, the scheduled operational task is an operational task associated with reception of and measurement on a Channel State Information Reference Signal (CSI-RS). In some embodiments, identifying the scheduled operational task which can be carried out in the non-overlapped portion of the communication slot comprises determining that a configured CSI-RS configuration fits within the non-overlapped portion of the communication slot.

In some embodiments, the scheduled operational task is an operational task associated with Physical Uplink Control Channel (PUCCH) transmission.

In some embodiments, the scheduled operational task is an operational task associated with Physical Uplink Shared Channel (PUSCH) transmission. In some embodiments, identifying the scheduled operational task which can be carried out in the non-overlapped portion of the communication slot comprises determining that at least one time domain resource allocation for PUSCH transmission fits within the non-overlapped portion of the communication slot.

In some embodiments, the scheduled operational task is an operational task associated with Sounding Reference Signal (SRS) transmission.

In some embodiments, the scheduled operational task comprises transmitting one or more signals in at least the non-overlapped portion of the communication slot; receiving one or more signals in at least the non-overlapped portion of the communication slot; transmitting one or more signals in at least the non-overlapped portion of the communication slot, provided that at least one symbol in the non-overlapped portion of the communication slot comprises a reference signal; receiving one or more signals in at least the non-overlapped portion of the communication slot, provided that at least one symbol in the non-overlapped portion of the communication slot comprises a reference signal; transmitting one or more signals in at least the non-overlapped portion of the communication slot, provided that the one or more signals are associated with a given priority, criticality, or both; receiving one or more signals in at least the non-overlapped portion of the communication slot, provided that the one or more signals are associated with a given priority, criticality, or both; transmitting one or more signals in at least the non-overlapped portion of the communication slot, provided that a length of the non-overlapped portion of the communication slot is above a given threshold; receiving one or more signals in at least the non-overlapped portion of the communication slot, provided that a length of the non-overlapped portion of the communication slot is above a given threshold; transmitting one or more signals in at least the non-overlapped portion of the communication slot, provided that the one or more signals are associated with a given numerology; receiving one or more signals in at least the non-overlapped portion of the communication slot, provided that the one or more signals are associated with a given numerology; transmitting one or more signals in at least the non-overlapped portion of the communication slot, provided that the one or more signals are associated with a given frequency range; receiving one or more signals in at least the non-overlapped portion of the communication slot, provided that the one or more signals are associated with a given frequency range; transmitting one or more signals in at least the non-overlapped portion of the communication slot, provided that the one or more signals are associated with a given transmission; or receiving one or more signals in at least the non-overlapped portion of the communication slot, provided that the one or more signals are associated with a given transmission.

In some embodiments, a wireless device for performing scheduled communications operations for a serving cell is adapted to determine a communication slot that is partially overlapped by a measurement gap, the communication slot being associated with a serving cell of the wireless device. The wireless device is further adapted to identify a scheduled operational task which can be carried out in a non-overlapped portion of the communication slot, the non-overlapped portion of the communication slot being a portion of the communication slot not overlapped by the measurement gap. The wireless device is further adapted to perform the scheduled operational task in the non-overlapped portion of the communication slot. In some embodiments, the wireless device comprises a radio interface and processing circuitry associated with the radio interface. The processing circuitry is configured to cause the wireless device to perform aforementioned actions.

Embodiments of a method of operation of a base station or network node and corresponding embodiments of a base station or network node are also disclosed. In some embodiments, a method performed by a base station for scheduling on a serving cell comprises determining that partially overlapped communication slots will occur for a wireless device on a serving cell of the wireless device due to one or more measurement gaps configured for the wireless device and determining non-overlapped portions of the partially overlapped communication slots. The method further comprises performing one or more operational tasks such that the non-overlapped portions of at least a subset of the overlapped communication slots are used for downlink transmission(s) to the wireless device or uplink transmission(s) from the wireless device.

In some embodiments, determining that the partially overlapped communication slots will occur for the wireless device on the serving cell comprises determining that the partially overlapped communication slots will occur for the wireless device on the serving cell based on a subcarrier spacing of a carrier associated with the serving cell and a measurement gap timing advance configured for the wireless device.

In some embodiments, the one or more operational tasks comprise adjusting a set of monitored PDCCH time domain instants and/or a set of PDSCH time domain resource allocations, such that the portion of the communication slot that is not overlapped by the measurement gap can be utilized for scheduling on downlink. In some embodiments, the one or more operational tasks comprise adjusting a set of PUSCH time domain resource allocations, such that the portion of the communication slot that is not overlapped by the measurement gap can be utilized for scheduling on uplink. In some embodiments, the one or more operational tasks comprise adjusting time domain resources for SRS. In some embodiments, the one or more operational tasks comprise adjusting time domain resources used for at least one format of PUCCH. In some embodiments, the one or more operational tasks comprise scheduling the wireless device in the portion of the communication slot that is not overlapped by the measurement gap.

In some embodiments, a method performed by a base station for scheduling communications operations for a serving cell comprises determining that a wireless device associated with a serving cell is to be configured with a measurement gaps, determining a communication slot that is partially overlapped by the measurement gap, and facilitating scheduling of an operational task in a portion of the communication slot that is not overlapped by the measurement gap.

In some embodiments, determining the communication slot that is partially overlapped by the measurement gap comprises determining that communication slot that is partially overlapped by the measurement gap based on a subcarrier spacing used for a carrier associated with the serving cell and a measurement gap timing advance configured for the wireless device.

In some embodiments, facilitating scheduling of the operational task in the portion of the communication slot that is not overlapped by the measurement gap comprises adjusting a set of monitored PDCCH time domain instants and/or a set of PDSCH time domain resource allocations, such that the portion of the communication slot that is not overlapped by the measurement gap can be utilized for scheduling on downlink. In some embodiments, facilitating scheduling of the operational task in the portion of the communication slot that is not overlapped by the measurement gap comprises adjusting a set of PUSCH time domain resource allocations, such that the portion of the communication slot that is not overlapped by the measurement gap can be utilized for scheduling on uplink. In some embodiments, facilitating scheduling of the operational task in the portion of the communication slot that is not overlapped by the measurement gap comprises adjusting time domain resources for SRS. In some embodiments, facilitating scheduling of the operational task in the portion of the communication slot that is not overlapped by the measurement gap comprises adjusting time domain resources used for at least one format of PUCCH. In some embodiments, facilitating scheduling of the operational task in the portion of the communication slot that is not overlapped by the measurement gap comprises scheduling the wireless device in the portion of the communication slot that is not overlapped by the measurement gap.

In some embodiments, a network node for scheduling communications operations for a serving cell is adapted to perform any one of the embodiments of the method performed by a base station or network node described above. In some embodiments, the network node comprises a radio interface and processing circuitry associated with the radio interface, where the processing circuitry is configured to cause the network node to perform any one of the embodiments of the method performed by a base station or network node described above.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1A:
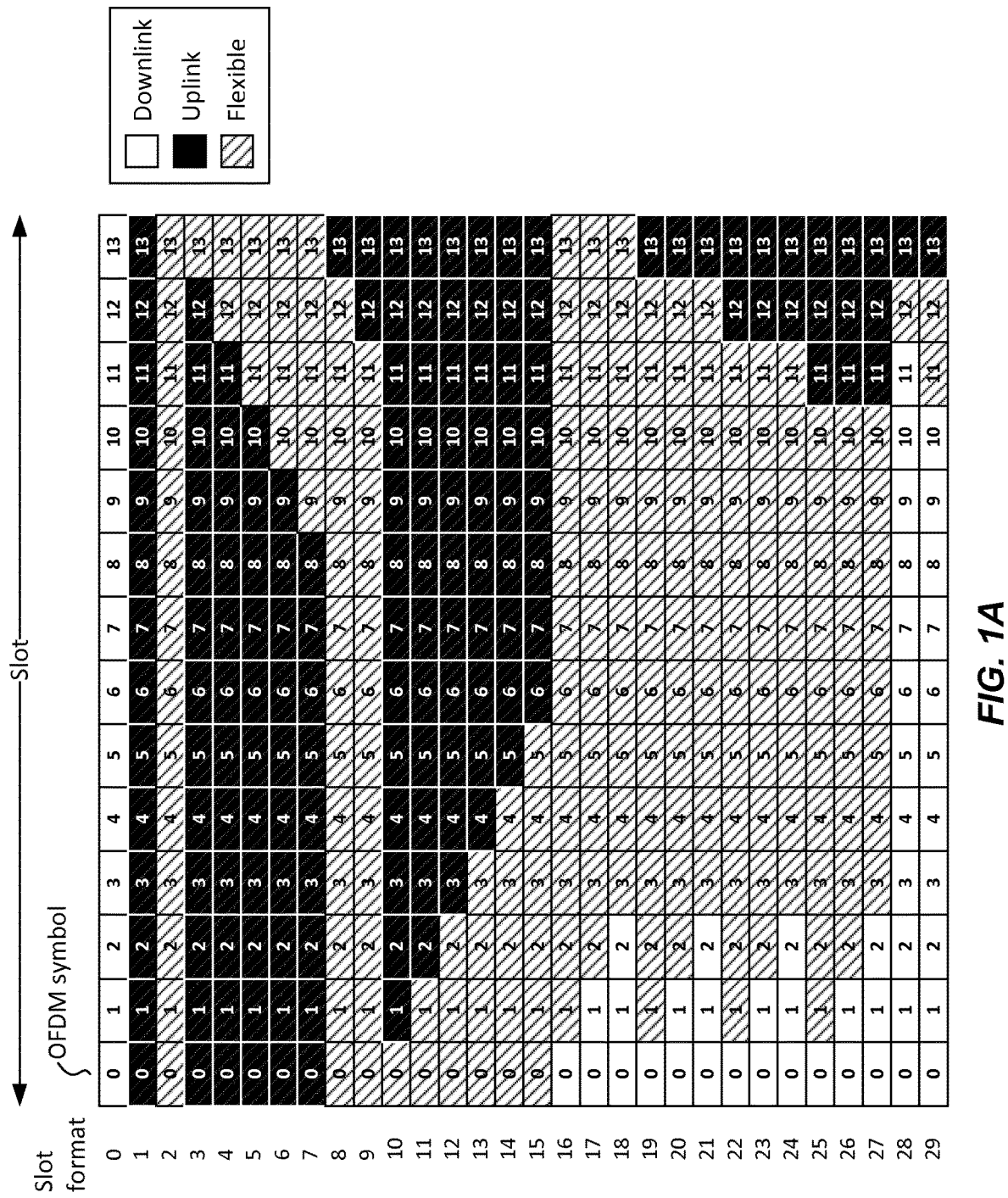
FIGS. 1A and 1B illustrate an example of the slot format in Third Generation Partnership Project (3GPP) New Radio (NR)
Figure 1B:
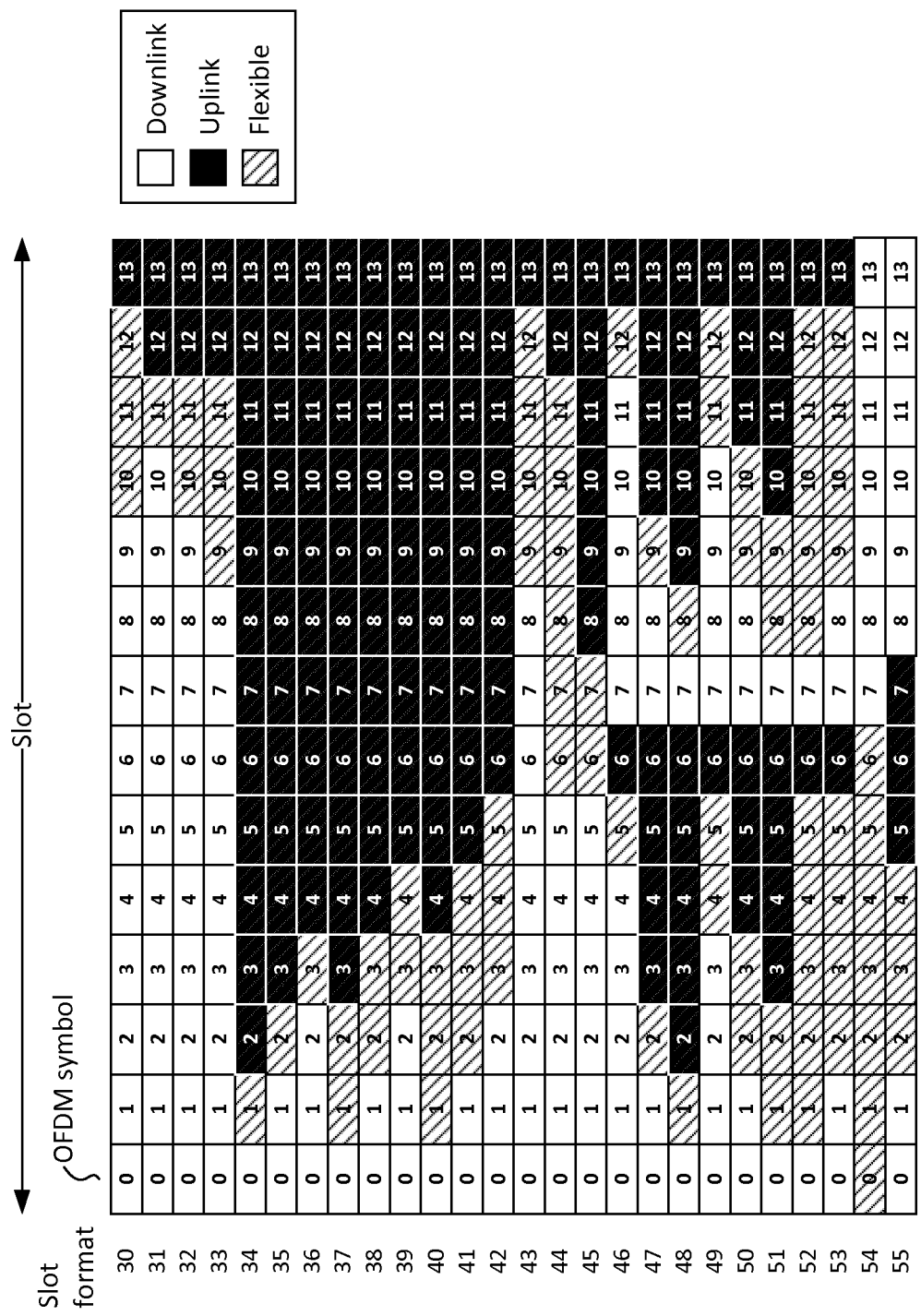
Figure 2:
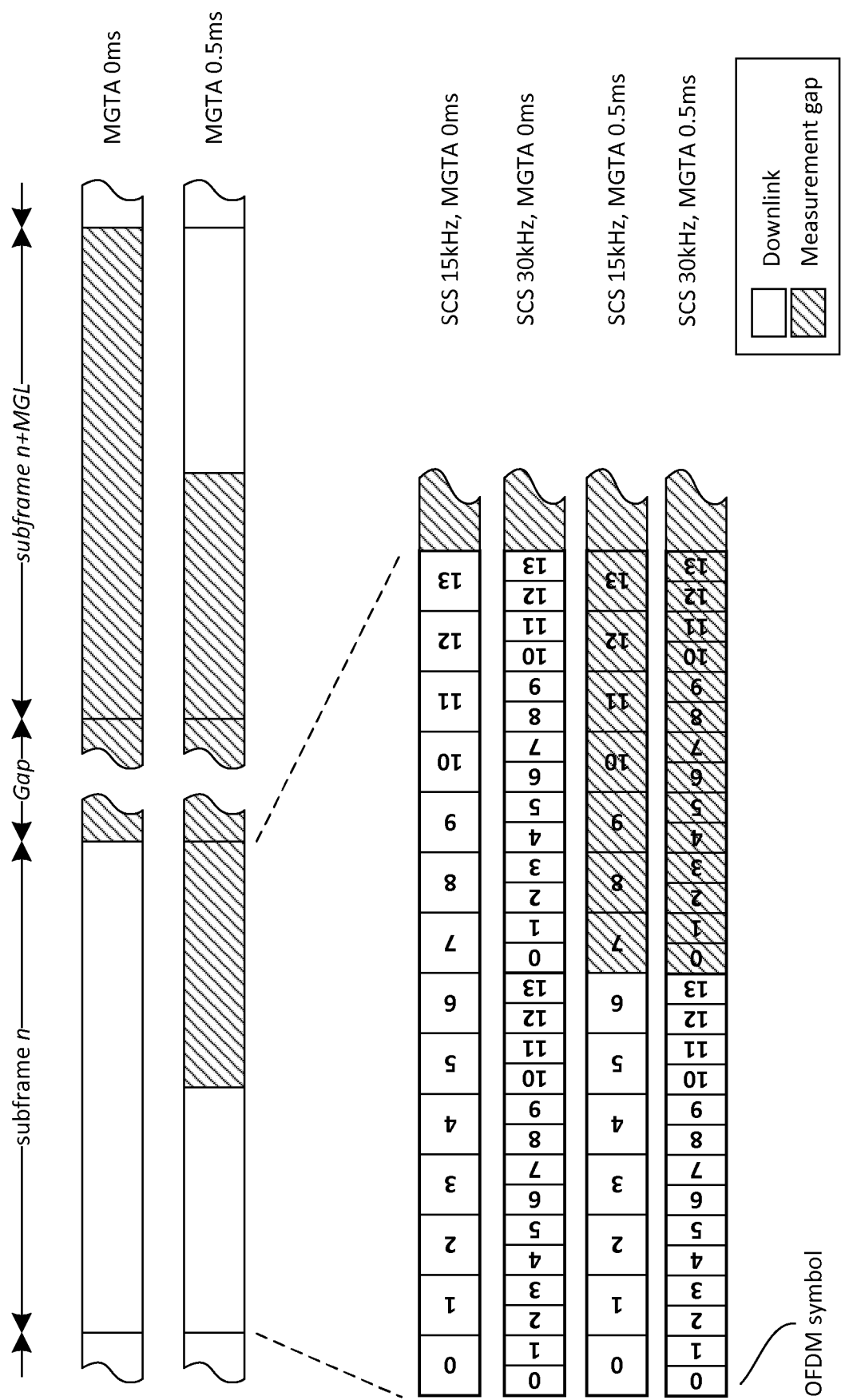
FIG. 2 illustrates an exemplary impact on downlink of a shifted measurement gap in Frequency Range 1 (FR1)
Figure 3:
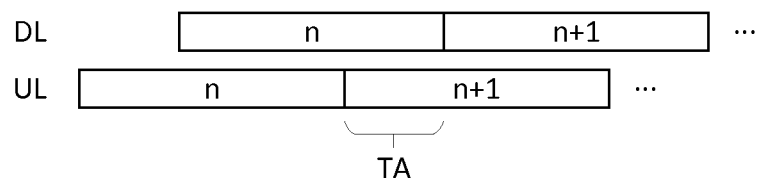
FIG. 3 illustrates Timing Advance (TA) of uplink subframe to downlink subframe for a Frequency Division Duplexing (FDD) carrier from the User Equipment (UE) perspective.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Embodiments of this disclosure may include systems, methods, and devices for wireless communications. Thus, particular embodiments of the disclosure may implement wireless communication standards, such as Global System for Mobile Communications (GSM), Universal Mobile Telecommunications System (UMTS), Long Term Evolution (LTE), and/or other suitable Second, Third, Fourth, or Fifth Generation (2G, 3G, 4G, or 5G) standards, including New Radio (NR).

In some embodiments a non-limiting term "UE" is used. The User Equipment (UE) herein can be any type of wireless device capable of communicating with a network node or another UE over radio signals. The UE may also be a radio communication device, target device, Device-to-Device (D2D) UE, machine type UE or UE capable of Machine-to-Machine (M2M) communication, a sensor equipped with a UE, a tablet, a mobile terminal, a smart phone, Laptop Embedded Equipment (LEE), Laptop Mounted Equipment (LME), Universal Serial Bus (USB) dongle, Customer Premise Equipment (CPE), etc. The term UE under test may refer to any type of UE. The UE under test may also be called a Device Under Test (DUT).

In some embodiments the generic terminology "network node" is used. A network node can be any kind of network node which may comprise a radio network node such as a base station, radio base station, base transceiver station, base station controller, network controller, next generation Node B (gNB), NR base station, enhanced or evolved Node B (eNB), Node B, Multi-Cell/Multicast Coordination Entity (MCE), relay node, access point, radio access point, Remote Radio Unit (RRU), Remote Radio Head (RRH), a Multi-Standard Radio (MSR) base station, a core network node (e.g., a Mobility Management Entity (MME), a Self-Organizing Network (SON) node, a coordinating node, a positioning node, a Minimization of Drive Tests (MDT) node, etc.), etc. The network node may also include test equipment.

A physical channel includes a set of resource elements carrying information originating from higher layers, for example a transport channel, Radio Resource Control (RRC) message, etc. Examples of downlink physical channels include Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat Request (HARQ) Indicator Channel (PHICH), Enhanced PDCCH (EPDCCH), Machine Type Communication (MTC) PDCCH (MPDCCH), Narrowband Internet of Things (NB-IoT) PDCCH (NPDCCH), NB-IoT PDSCH (NPDSCH), NB-IoT PBCH (NPBCH), etc.

The term slot used herein may correspond to any type of physical resource or radio resource expressed in terms of length of time. A slot may comprise one or more symbols. The term slot may also be interchangeably called a time resource, or a time slot, or a communications slot. Examples of time resources are: a symbol or group of symbols, subframe, radio frame, Transmit Time Interval (TTI), interleaving time, special subframe, Uplink Pilot Time Slot (UpPTS), mini-slot, subslot, scheduling time unit, etc.

The term time-frequency resource is used herein for any radio resource defined in any time-frequency resource grid in a cell. Examples of a time-frequency resource are a Resource Block (RB), subcarrier, etc. The RB may also be interchangeably called a Physical RB (PRB), a Virtual RB (VRB), etc.

The term numerology used herein may characterize or define signal characteristics in time and/or in frequency. Examples of parameters defining numerology include any one or more of the following: frame duration, subframe, TTI duration, slot duration, min-slot duration, symbol durations, Subcarrier Spacing (SCS), number of subcarriers per physical channel (e.g., RB), number of RBs within the bandwidth, Cyclic Prefix (CP) length, etc.

The embodiments are applicable for any Orthogonal Frequency Division Multiple Access (OFDMA)-based system where signals are generated based on OFDMA-based technology. The general OFDMA-based technology herein may comprise different variants. Specific examples of OFDMA-based technology include Signal Carrier Frequency Division Multiple Access (SC-FDMA), CP OFDMA (CP-OFDMA), Discrete Fourier Transform-spread-Orthogonal Frequency Division Multiplexing (OFDM) (DFT-s-OFDM), etc.

In discussions for the Third Generation Partnership Project (3GPP) standard regarding UE behavior around measurement gaps in NR, it is so far considered that if a scheduling time unit (e.g., NR slot) is not complete due to being partially overlapped by a measurement gap due to Measurement Gap Timing Advance (MGTA) in case of downlink and due to both MGTA and Timing Advance (TA) in case of uplink, the UE is to entirely discard operational tasks for reception and/or transmission in the corresponding scheduling unit in time. This follows from the Evolved Universal Terrestrial Radio Access (E-UTRA) legacy, in which data channel allocations fill the whole scheduling unit in time (e.g., E-UTRA subframe).

Discarding reception and/or transmission in slots that are partially overlapped by a measurement gap means loss of scheduling opportunities for a UE, with adverse effects on achievable UE throughput as well as secondary impacts on system throughput. For example, RRC signaling related to mobility and radio resource management may get unnecessarily delayed.

In NR, baseline allocation of data and control channels is more flexible than in E-UTRA, and measurement gap patterns may be denser (periodicity of 20 milliseconds (ms)). In addition, the UE may have to tune in to a different Bandwidth Part (BWP) for conducting intra-frequency measurements between the measurement gaps, depending on capability and/or configuration. Thus, it is desirable to specify a UE behavior where loss of scheduling opportunities is minimized.

Certain aspects of the present disclosure and their embodiments may provide solutions to these or other challenges. According to an exemplary embodiment of the proposed solution, a UE operates to:

Determine the measurement gap location relative to the serving cell(s), based on the measurement gap configuration and predefined rules;

Determine for downlink and/or uplink in the serving cell(s) (depending on duplex mode, and in case of Time Division Duplexing (TDD), slot pattern (TDD configuration for each slot as uplink/downlink/flexible)), which slots are partially overlapped by the measurement gap;

For each of partially overlapped slots on downlink and/or uplink, identify which operational tasks are scheduled, and determine which of those can be carried out in the non-overlapped part of the slot; and Carry out the reception and/or transmission operational tasks, determined in the previous step, in the part(s) of the slot(s) that are not overlapped by the measurement gap.

Further, according to some embodiments of the proposed solution, a base station scheduler operates to, once it has been decided that a UE is to be configured with measurement gaps, carry out some or all of the following actions:

Determine, based on numerology in use (e.g., SCS, slot length, etc.) in serving cells(s) and measurement gap configuration including MGTA, whether partially overlapped slots will arise for the UE on downlink, and for such slots, which parts will be non-overlapped by the measurement gap (before and after the gap);

Adjust, if necessary and via RRC signaling, the sets of monitored PDCCH time domain instants (Control Resource Set (CORESET)) and PDSCH time domain resource allocations, such that at least a subset of partially overlapped slots can be utilized for scheduling on downlink;

Determine, based on numerology (e.g., SCS, slot length, etc.) in use in serving cell(s), measurement gap configuration and uplink-downlink TA for the concerned UE, whether partially overlapped slots will arise on uplink, and for such slots, which parts will be non-overlapped by the measurement gap (before and after the gap);

Adjust, if necessary and via RRC signaling, the set of Physical Uplink Shared Channel (PUSCH) time domain resource allocations, such that at least a subset of partially overlapped slots can be utilized for scheduling on uplink;

Adjust, if necessary and via RRC signaling, the time domain resources for Sounding Reference Signal (SRS);

Adjust, if necessary and via RRC signaling, the time domain resources used for at least one format of Physical Uplink Control Channel (PUCCH); and Schedule the UE, if needed, in the partially overlapped slots, with time domain resource allocation configurations that have been prepared for the same.

Certain embodiments may provide one or more of the following technical advantages. The solution provides more scheduling opportunities of a UE than would otherwise result when measurement gaps are configured. This leads to an increase in the achievable UE throughput on downlink and/or uplink, since more resources are available over a given time-frame—for instance a measurement gap repetition period.

More scheduling opportunities on the downlink additionally leads to fewer restrictions on when RRC signaling (PDSCH) and Media Access Control (MAC) signaling (PDCCH) can be sent by the network to the UE. This allows signaling related to, for example mobility and radio resource management, be sent immediately before the gap when the network otherwise would have to had to wait until after the gap. Shortened time for commands related to mobility and radio resource management in general leads to higher system throughput as the UE changes to the best suited cell(s) sooner than had otherwise been the case. This additionally leads to higher achievable UE throughput.

More scheduling opportunities on the uplink additionally reduces RRC signaling latency and for example leads to fewer restrictions on when measurement reports can be sent by the UE to the network. As an example, such measurement reports can be sent due to triggered events wherein a neighbor cell has become stronger than any of the serving cells, and may therefore be a better cell for the UE to use. Receiving such information in a more timely manner allows the network to command the UE to a better cell earlier, thereby improving the system throughput. This additionally leads to higher achievable UE throughout.

System throughput and UE throughput improvements can arise due to shortened latency for mobility and radio resource management. When a UE is operating in the better cell, less robustness is needed in the encoding of the transmitted messages (e.g., higher modulation and coding schemes can be used). Thus more information related to the transmitted message can be sent within a given allocation size, e.g. a PRB.

Method in a UE

Figure 4:
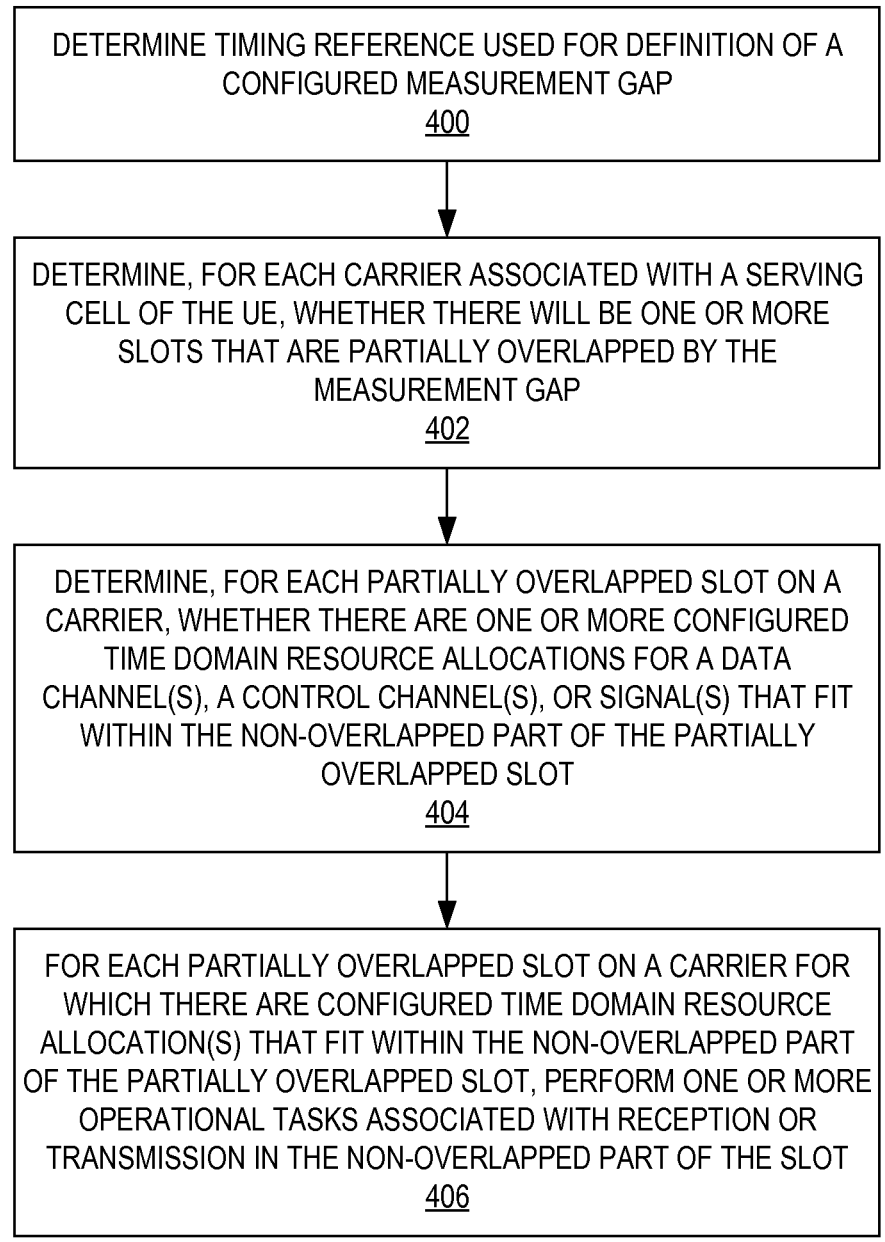
FIG. 4 is a flow chart that illustrates the operation of a UE in accordance with some embodiments of the present disclosure.

In an exemplary embodiment, a UE executes the following steps, which are illustrated in the flow chart of FIG. 4, upon receiving a measurement gap configuration, or when a measurement gap has been configured and the UE is receiving new RRC signaling relating to time domain resource allocation of physical channels or signals:

Step 400: Determine the timing reference used for the definition of the measurement gap (downlink or uplink according to a predefined rule);

Step 402: Determine, for each carrier associated with a serving cell, whether there will be slots that are partially overlapped by the measurement gap, and for each such slot, which time interval, e.g. in OFDM symbols, is non-overlapped;

Step 404: Determine, for each partially overlapped slot on a carrier, whether there are configured time domain resource allocations for data channels, control channels, and/or signals that fit within the non-overlapped part of the slot; and Step 406: Perform, in partially overlapped slots for which it has been concluded that configured time domain resource allocation fit within the non-overlapped part of the slot, operational tasks associated with reception or transmission in the non-overlapped part of the slot.

In step 400, a predefined rule in the standard may define whether to use the downlink or uplink reference timing (e.g., subframe timing) as reference for the measurement gap. Typically for Frequency Division Duplexing (FDD) systems, the timing reference for the measurement gaps is based on the downlink timing, whereas for TDD systems, it may depend on the slots before and after the location of the measurement gap. If any of those slots is a downlink slot, the timing reference may be the downlink timing. Conversely, if both slots are uplink slots or the slot before the gap is a special slot (containing some OFDM symbols used for downlink and some used for uplink—see section on TDD slot formats, above) and the one after the gap is an uplink slot, the timing reference is the uplink timing. The exact definition of the timing reference is not important for the solution, as long as it is a well-defined rule known to both the UE and the base station scheduler.

In step 402, the UE checks the measurement gap configuration with the configuration of each carrier in the Master Cell Group (MCG) and/or Secondary Cell Group (SCG). If it is an FDD system, whereby the timing reference is the downlink timing, partially overlapped slots on downlink will result when SCS 15 kilohertz (kHz) in combination with MGTA of 0.5 ms is used since the slot duration is 1 ms. For other numerologies, e.g., SCS 30, 60, 120, and 240 kHz, a non-zero MGTA will result in a shift of timing for the measurement gap that corresponds to a multiple of slots, and no partially overlapped downlink slots will result. However, due to uplink-downlink TA, whereby the UE transmit timing reference for the uplink is advanced compared to the UE reception timing reference, partially overlapped uplink slots will generally result regardless of the combination of SCS and MGTA in use. If it is a TDD system, the impacted slots will depend on the slot pattern with respect to uplink and downlink slots, and special slots.

Different numerologies (e.g., different SCSs) may be used on different carriers with carrier aggregation; hence, the impact of MGTA and uplink-downlink TA on slots may be different on different carriers. For instance, in an FDD system, if one carrier is using SCS 15 kHz and other carriers use 30 kHz, an MGTA of 0.5 ms will result in partial downlink slots only on the first carrier. On the uplink, when different numerologies are used on different carriers, uplink-downlink TA may result in different impact on uplink slots on different carriers. On one carrier, only a small part of the slot may be overlapped whereas on another carrier a larger part of a slot may be overlapped by the measurement gap. The degree of overlap depends on the slot length and the relative position of the particular slot to the start of the measurement gap.

For each slot that is partially overlapped by the measurement gap, the UE determines how much, e.g. in terms of OFDM symbols, of the slot remains as non-overlapped. For a partially overlapped slot before the measurement gap, this means that the UE determines how many OFDM symbols starting from the first OFDM symbol in the slot remain, e.g., how many leading symbols remain. For example, symbols 0 . . . N, N<13 can remain for normal CP and 0 . . . N, N<11 can remain for extended CP. For a partially overlapped slot after the measurement gap, the UE determines how many trailing OFDM symbols remain, e.g., OFDM symbols at the end of the slot. For example, symbols M . . . 13, M>0 can remain for normal CP and M . . . 11, M>0 can remain for extended CP.

In other words, the UE is configured with a number of serving cells, each of which is on a respective carrier. The UE is also configured with a measurement gap configuration. For each particular measurement gap configured by the measurement gap configuration, the UE determines whether the measurement gap will result in any partially overlapped slots for each serving cell. So, for each serving cell of the UE, the UE determines the location of the measurement gap for that serving cell. More specifically, the UE the determines the reference timing for the measurement gap on the carrier for that serving cell, e.g., based on a predefined rule, as described above with respect to step 400. The UE then uses the determined reference timing, the configured time offset of the measurement gap, and the configured MGTA to determine the location of the measurement gap (e.g., the start (e.g., starting OFDM symbol as adjusted by the MGTA) and the duration of the measurement gap (e.g., in terms of number of OFDM symbols)). Note that, if the timing reference for the measurement gap is based on the uplink timing, then the location of the measurement gap also depends on the uplink-downlink TA. The UE can then determine, or identify, the partially overlapping slots (i.e., the slot(s) that is(are) partially overlapped by the measurement gap) and the size(s) of the non-overlapping portion(s) of the partially overlapping slot(s).

In step 404, the UE compares the non-overlapped part of the partially overlapped slots at the beginning and end of the measurement gap with the time domain resource allocations that it has been configured with by the network. In other words, the UE determines, for each partially overlapped slot on a carrier of a serving cell, whether there are one or more configured time domain resource allocations for a data channel(s), a control channel(s), or signal(s) that fit within the non-overlapped part of the partially overlapped slot.

Particularly for downlink, the UE compares the CORE-SET configurations with respect to monitored OFDM symbol positions (monitoringSymbolsWithinSlot) to determine whether there is at least one PDCCH monitoring position that fits within the remaining part of the slots at the beginning and/or at the end of the measurement gap. The UE also checks that the reference signal (e.g., Demodulation Reference Signal (DM-RS)) needed for demodulation of the PDCCH is available in the remaining part of each such slot. If this is fulfilled for a slot, the UE concludes that it is to perform operational tasks associated with PDCCH monitoring for those monitoring positions that fit within the remaining, non-overlapped part of that particular downlink slot.

Moreover, for PDSCH, the UE compares the configured time domain allocations (start symbol and length) in the PDSCH-TimeDomainResourceAllocationList with the remaining non-overlapped part of the slot. If at least one time domain resource allocation, and the reference signal (e.g., DM-RS) needed for demodulation of PDSCH, fit within the remaining part of a partially overlapped slot, the UE concludes that it shall be prepared on performing operational tasks associated with PDSCH reception (e.g., PDSCH demodulation and decoding). Whether the UE shall actually carry out the tasks depends on whether it has received Downlink Control Information (DCI) on PDCCH (either in the same slot or in an earlier slot) that points out any of the PDSCH time domain resource allocations that can fit in the remaining part of the slot.

Furthermore, if the UE is configured to measure a signal (e.g., to perform a Channel State Information (CSI) measurement using reference signal (CSI Reference Signal (CSI-RS))), the UE determines whether the configured CSI-RS configuration fits within the remaining non-overlapped part of a slot. If so, the UE deduces that it shall perform operational tasks associated with reception of and measurement on the reference signal (e.g., CSI-RS) in that partially overlapped slot. Measurement on other signals follows the same principle.

The uplink follows the same principle as downlink with respect to configurations of PUSCH, PUCCH, SRS, etc.

In step 406, when the UE encounters a partially overlapped slot on a carrier, it carries out the operational tasks it has identified in previous steps. The operational tasks include one or more combinations of the following examples:

- In one example, the operational task comprises transmitting and/or receiving signals in at least a given portion of the slot that does not overlap with the measurement gap.
- In yet another example, the operational task comprises transmitting and/or receiving signals in at least a given portion of the slot that does not overlap with the measurement gap, provided that at least one symbol contains a reference signal (e.g., DM-RS, SRS, etc.).
- In yet another example, the operational task comprises transmitting and/or receiving signals in at least a given portion of the slot that does not overlap with the measurement gap, provided that the signals are associated with a given priority and/or criticality etc. Examples of such signals are positioning reference signals, signals used for a given measurements such as CSI-RS, etc.
- In yet another example the operational task comprises transmitting and/or receiving signals in at least a given portion of the slot that does not overlap with the measurement gap provided that the length of that given portion is above a given threshold (e.g., can contain at least X number of symbols). Examples of X are 2, 4, etc.
- In yet another example, the operational task comprises transmitting and/or receiving signals in at least a given portion of the slot that does not overlap with the measurement gap provided that the signals are associated with a given numerology. For example, the UE transmitting and/or receiving signals only if the SCS of the signals is above a given SCS threshold (e.g., 30 kHz) and/or the slot length is shorter than a given threshold (e.g., smaller than 0.5 ms).
- In yet another example, the operational task comprises transmitting and/or receiving signals in at least a given portion of the slot that does not overlap with the measurement gap provided that the signals are associated with a given Frequency Range (FR). For example, the UE transmits and/or receives signals only if the FR is above a given threshold (e.g., FR is above 6 gigahertz (GHz), FR is FR 2 (FR2), etc.).
- In yet another example, the operational task comprises transmitting and/or receiving signals in at least a given portion of the slot that does not overlap with the measurement gap provided that the signals are associated with a particular transmission (e.g., in downlink and/or in uplink) (e.g., first transmission of PDSCH or PUSCH or a retransmission of PDSCH or PUSCH).

The UE may re-evaluate steps 400-404 every time a new measurement gap configuration is received or every time an updated channel or signal configuration is received. For uplink subframes and special subframes, the UE may additionally re-evaluate steps 400-404 every time there is a significant change in uplink-downlink TA.

For a TDD special slot, the description above for downlink slots may apply to a field of downlink OFDM symbols and the description above for uplink slots may apply to a field of uplink OFDM symbols. A partially overlapped special slot may, for instance, have an intact or partially overlapped field of downlink OFDM symbols, while the field of uplink OFDM symbols is partially or fully overlapped by the measurement gap at the start of the measurement gap. At the end of the measurement gap, it is vice versa.

Method in a Network Node

The network node takes into account that a UE configured with measurement gaps may have partially overlapped slots on downlink and/or on uplink. It may then prepare PDSCH and/or PUSCH time domain resource allocations, CORESET monitored symbols within slot configurations, PUCCH format configurations, CSI-RS and Phase Tracking Reference Signal (PT-RS) configurations, and SRS configurations that allow at least one of a slot before a measurement gap and a slot after a measurement gap to be used for scheduling even when the slot is partially overlapped by the measurement gap.

Figure 5:
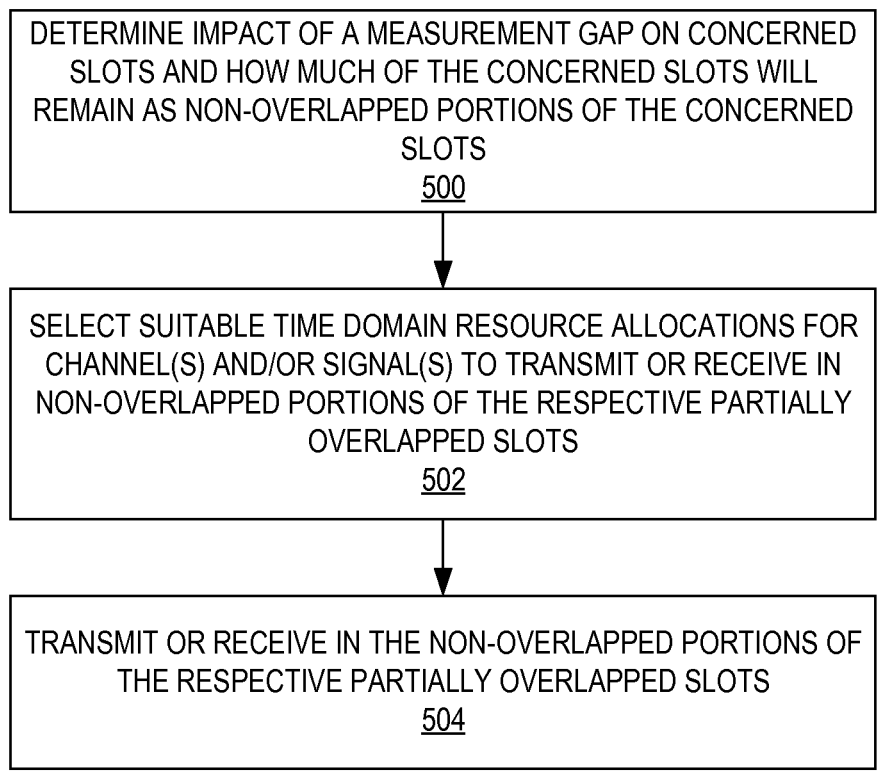
FIG. 5 is a flow chart that illustrates the operation of a network node (e.g., a base station) in accordance with some embodiments of the present disclosure.

The analysis follows very much the same as for the UE method above since it is beneficial or even necessary that the network and UE have the same understanding of scheduling availability. As illustrated in FIG. 5, the network node determines the impact of the measurement gap on the concerned slots, and how much will remain as non-overlapped in each slot (e.g., downlink slot before gap, downlink slot after gap, uplink slot before gap, uplink slot after gap) (step 500). Based on this, the network node selects suitable time domain resource allocations for the channels and/or signals to transmit or receive in the respective slot, if any such configurations are found (step 502). A slot for which a suitable configuration has been prepared, and for which the UE has received a corresponding RRC configuration from the network node, is considered a slot that is available for scheduling the UE. If no suitable configurations have been found, or a suitable configuration has been found but the UE has not been configured with a corresponding RRC configuration, the slot is not considered to be available for scheduling the UE. Hence the network node may consider none, one, or more of the partially overlapped downlink and uplink slots before and after the measurement gap as suitable for scheduling. The network node transmits or receives in the non-overlapped portions of the respective partially overlapped slots in accordance with the result of step 502 (step 504).

Based on the set of slots considered to be suitable for scheduling the UE, the network node may adapt one or more of:

Time between DCI and the allocation (k0, k2)

HARQ feedback time (time between reception of PDSCH until an Acknowledgement (ACK) or Negative Acknowledgement (NACK)), indicating success or failure to decode the related transport block, is to be sent on PUCCH or PUSCH For determining impact on partially overlapped slots due to uplink-downlink TA (uplink slots in FDD systems, uplink or downlink slots in TDD systems depending on which timing reference is used for the measurement gap start), the network node may use a stored uplink-downlink TA value that it keeps for each UE (e.g., by aggregating the TA commands sent to the UE). If no such uplink-downlink TA value exists, the network node may use other means for estimating the time difference between uplink and downlink for the particular UE, for example by estimating the distance of the UE from the transmitter point in the cell. The estimated distance can be converted into propagation time, which when doubled corresponds to the dynamic part of the uplink-downlink TA. There may also be a static part of the uplink-downlink TA (e.g., a designed time offset between downlink and uplink timing in the network node), but this is a design parameter known to the network node and can therefore be taken into account. Several positioning methods exist in prior art for determining the distance or the location of a UE. Examples of such methods comprise determining the location of the UE using one or more of: Global Navigation Satellite System (GNSS) systems (e.g., Global Positioning System (GPS), Assisted GPS (A-GPS), etc.), a Round Trip Time (RTT) (which can be measured by the UE and reported to the network node and/or estimated by the network node), measurement of the received time difference of signals at the UE from pair of cells, etc.

Figure 6:
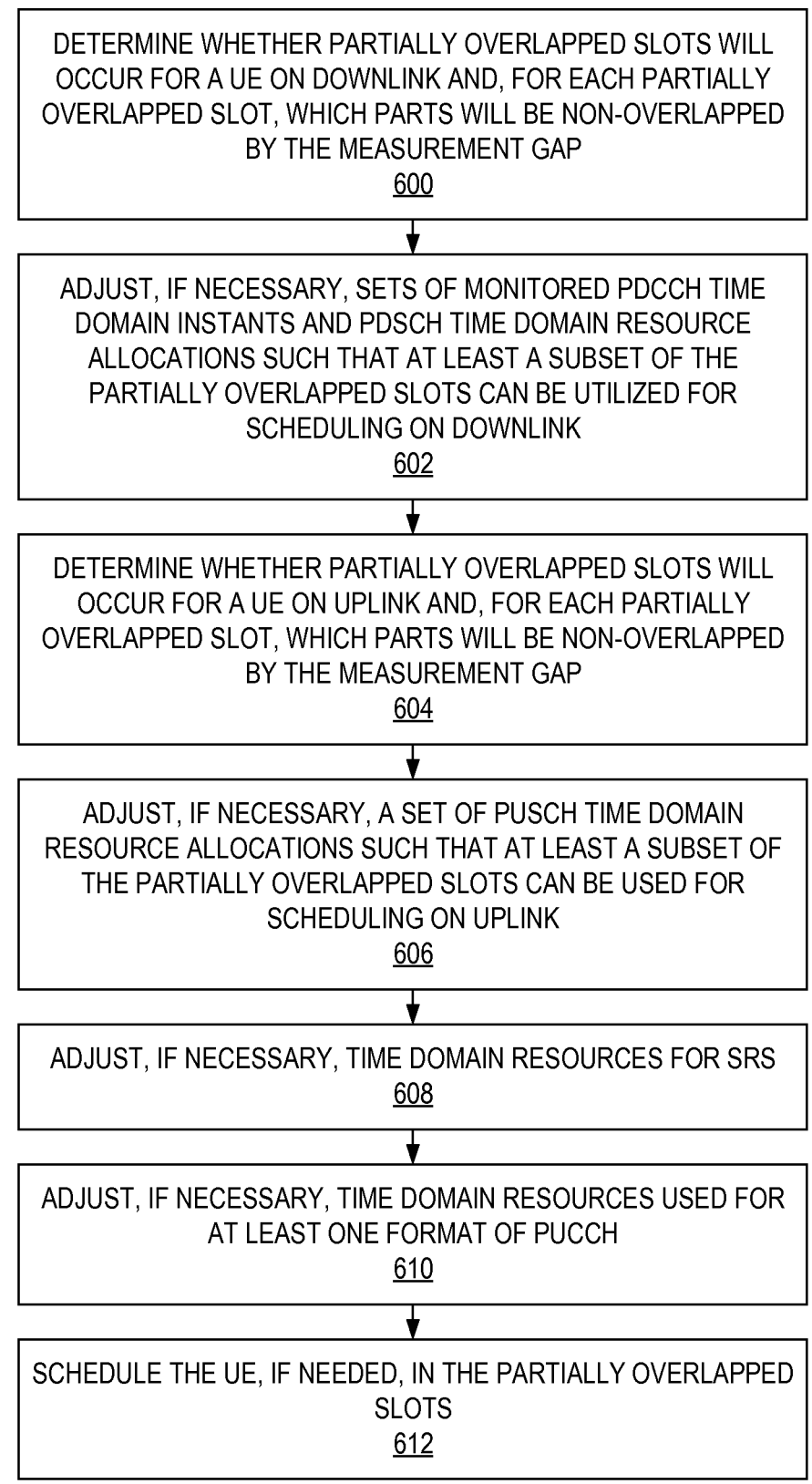
FIG. 6 is a flow chart that illustrates the operation of a UE in accordance with some embodiments of the present disclosure.

As illustrated in FIG. 6, according to some embodiments of the proposed solution, a base station scheduler operates to, once it has been decided that a UE is to be configured with measurement gaps, carry out some or all of the following actions:

Step 600: Determine, based on numerology in use (e.g. SCS, slot length, etc.) in serving cells(s) and measurement gap configuration including MGTA, whether partially overlapped slots will arise for the UE on downlink and, for such slots, which parts will be non-overlapped by the measurement gap (before and after the gap);

Step 602: Adjust, if necessary and via RRC signaling, the sets of monitored PDCCH time domain instants (CORESET) and PDSCH time domain resource allocations, such that at least a subset of partially overlapped slots can be utilized for scheduling on downlink;

Step 604: Determine, based on numerology (e.g., SCS, slot length, etc.) in use in serving cell(s), measurement gap configuration and uplink-downlink TA for the concerned UE, whether partially overlapped slots will arise on uplink, and for such slots, which parts will be non-overlapped by the measurement gap (before and after the gap);

Step 606: Adjust, if necessary and via RRC signaling, the set of PUSCH time domain resource allocations, such that at least a subset of partially overlapped slots can be utilized for scheduling on uplink;

Step 608: Adjust, if necessary and via RRC signaling, the time domain resources for SRS;

Step 610: Adjust, if necessary and via RRC signaling, the time domain resources used for at least one format of PUCCH; and Step 612: Schedule the UE, if needed, in the partially overlapped slots, with time domain resource allocation configurations that have been prepared for the same.

Additional Aspects

Figure 7:
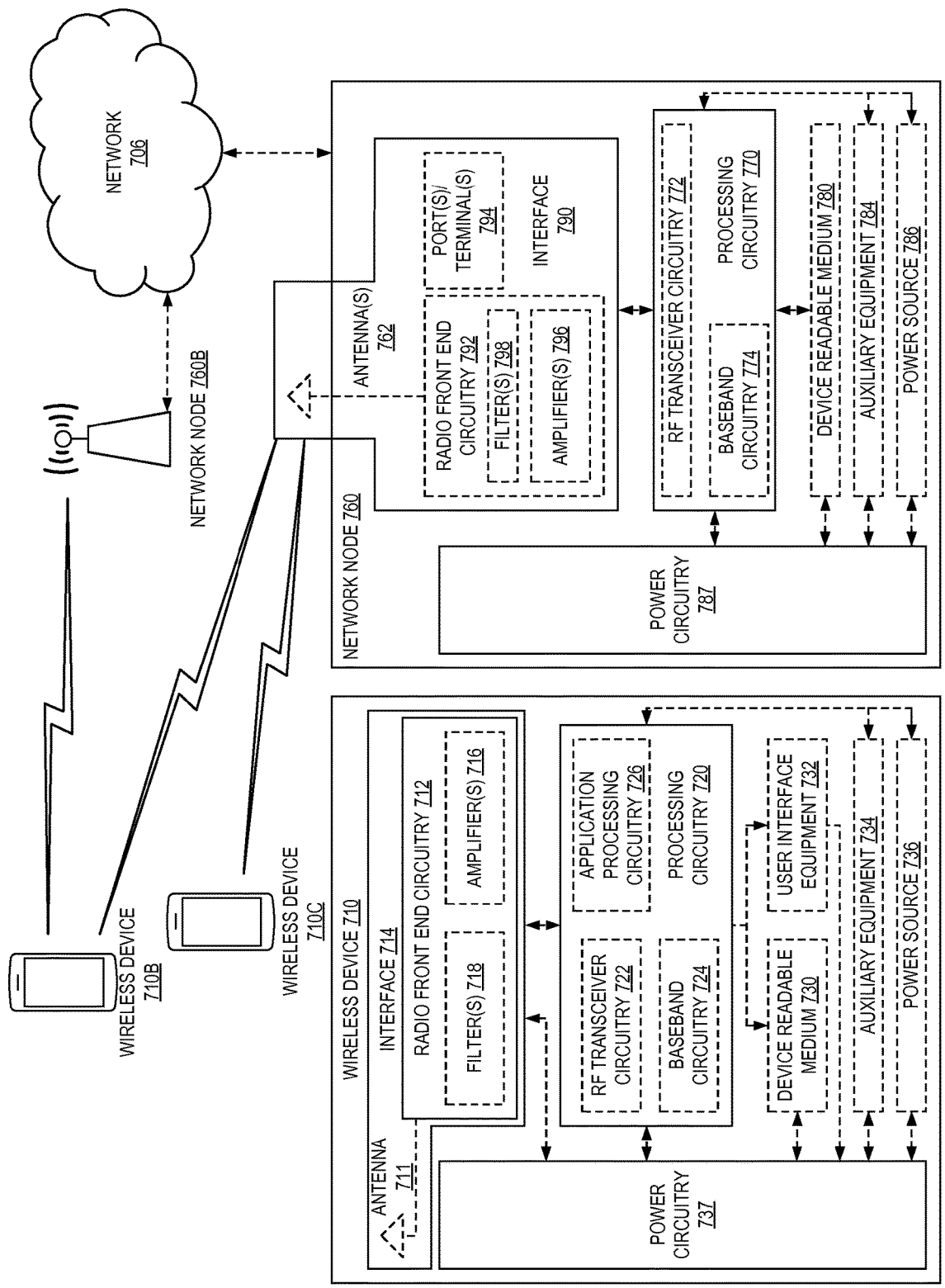
FIG. 7 illustrates one example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts a network 706, network nodes 760 and 760B, and Wireless Devices (WDs) 710, 710B, and 710C. In practice, a wireless network may further include any additional elements suitable to support communication between wireless devices or between a wireless device and another communication device, such as a landline telephone, a service provider, or any other network node or end device. Of the illustrated components, the network node 760 and the WD 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as GSM, UMTS, LTE, and/or other suitable 2G, 3G, 4G, or 5G standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 706 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 760 and the WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or RRUs, sometimes referred to as RRHs. Such RRUs may or may not be integrated with an antenna as an antenna integrated radio. Parts of a distributed radio base station may also be referred to as nodes in a Distributed Antenna System (DAS). Yet further examples of network nodes include MSR equipment such as MSR BSs, network controllers such as Radio Network Controllers (RNCs) or BS Controllers (BSCs), Base Transceiver Stations (BTSs), transmission points, transmission nodes, MCEs, core network nodes (e.g., Mobile Switching Centers (MSCs), MMEs), Operation and Maintenance (O&M) nodes, Operations Support System (OSS) nodes, SON nodes, positioning nodes (e.g., Evolved Serving Mobile Location Center (E-SMLCs)), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, the network node 760 includes processing circuitry 770, a device readable medium 780, an interface 790, auxiliary equipment 784, a power source 786, power circuitry 787, and an antenna 762. Although the network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 760 are depicted as single boxes located within a larger box, or nested within multiple boxes, in practice, a network node may comprise multiple different physical components that make up a single illustrated component (e.g., the device readable medium 780 may comprise multiple separate hard drives as well as multiple Random Access Memory (RAM) modules).

Similarly, the network node 760 may be composed of multiple physically separate components (e.g., a Node B component and a RNC component, or a BTS component and a BSC component, etc.), which may each have their own respective components. In certain scenarios in which the network node 760 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 760 may be configured to support multiple Radio Access Technologies (RATs). In such embodiments, some components may be duplicated (e.g., a separate device readable medium 780 for the different RATs) and some components may be reused (e.g., the same antenna 762 may be shared by the RATs). The network node 760 may also include multiple sets of the various illustrated components for different wireless technologies integrated into the network node 760, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 760.

The processing circuitry 770 is configured to perform any determining, calculating, or similar operations (e.g., certain obtaining operations) described herein as being provided by a network node. These operations performed by the processing circuitry 770 may include processing information obtained by the processing circuitry 770 by, for example, converting the obtained information into other information, comparing the obtained information or converted information to information stored in the network node, and/or performing one or more operations based on the obtained information or converted information, and as a result of said processing making a determination.

The processing circuitry 770 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 760 components, such as the device readable medium 780, network node 760 functionality. For example, the processing circuitry 770 may execute instructions stored in the device readable medium 780 or in memory within the processing circuitry 770. Such functionality may include providing any of the various wireless features, functions, or benefits discussed herein. In some embodiments, the processing circuitry 770 may include a System on a Chip (SOC).

In some embodiments, the processing circuitry 770 may include one or more of Radio Frequency (RF) transceiver circuitry 772 and baseband processing circuitry 774. In some embodiments, the RF transceiver circuitry 772 and the baseband processing circuitry 774 may be on separate chips (or sets of chips), boards, or units, such as radio units and digital units. In alternative embodiments, part or all of the RF transceiver circuitry 772 and the baseband processing circuitry 774 may be on the same chip or set of chips, boards, or units.

In certain embodiments, some or all of the functionality described herein as being provided by a network node, base station, eNB, or other such network device may be performed by the processing circuitry 770 executing instructions stored on the device readable medium 780 or memory within the processing circuitry 770. In alternative embodiments, some or all of the functionality may be provided by the processing circuitry 770 without executing instructions stored on a separate or discrete device readable medium, such as in a hard-wired manner. In any of those embodiments, whether executing instructions stored on a device readable storage medium or not, the processing circuitry 770 can be configured to perform the described functionality. The benefits provided by such functionality are not limited to the processing circuitry 770 alone or to other components of the network node 760, but are enjoyed by the network node 760 as a whole, and/or by end users and the wireless network generally.

The device readable medium 780 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 770. The device readable medium 780 may store any suitable instructions; data or information, including a computer program; software; an application including one or more of logic, rules, code, tables, etc.; and/or other instructions capable of being executed by the processing circuitry 770 and utilized by the network node 760. The device readable medium 780 may be used to store any calculations made by the processing circuitry 770 and/or any data received via the interface 790. In some embodiments, the processing circuitry 770 and the device readable medium 780 may be considered to be integrated.

The interface 790 is used in the wired or wireless communication of signaling and/or data between the network node 760, a network 706, and/or WDs 710. As illustrated, the interface 790 comprises port(s)/terminal(s) 794 to send and receive data, for example to and from the network 706 over a wired connection. The interface 790 also includes radio front end circuitry 792 that may be coupled to, or in certain embodiments a part of, the antenna 762. The radio front end circuitry 792 comprises filters 798 and amplifiers 796. The radio front end circuitry 792 may be connected to the antenna 762 and the processing circuitry 770. The radio front end circuitry 792 may be configured to condition signals communicated between the antenna 762 and the processing circuitry 770. The radio front end circuitry 792 may receive digital data that is to be sent out to other network nodes or WDs via a wireless connection. The radio front end circuitry 792 may convert the digital data into a radio signal having the appropriate channel and bandwidth parameters using a combination of the filters 798 and/or the amplifiers 796. The radio signal may then be transmitted via the antenna 762. Similarly, when receiving data, the antenna 762 may collect radio signals which are then converted into digital data by the radio front end circuitry 792. The digital data may be passed to the processing circuitry 770. In other embodiments, the interface 790 may comprise different components and/or different combinations of components.

In certain alternative embodiments, the network node 760 may not include separate radio front end circuitry 792; instead, the processing circuitry 770 may comprise radio front end circuitry and may be connected to the antenna 762 without separate radio front end circuitry 792. Similarly, in some embodiments, all or some of the RF transceiver circuitry 772 may be considered a part of the interface 790. In still other embodiments, the interface 790 may include the one or more ports or terminals 794, the radio front end circuitry 792, and the RF transceiver circuitry 772 as part of a radio unit (not shown), and the interface 790 may communicate with the baseband processing circuitry 774, which is part of a digital unit (not shown).

The antenna 762 may include one or more antennas, or antenna arrays, configured to send and/or receive wireless signals. The antenna 762 may be coupled to the radio front end circuitry 792 and may be any type of antenna capable of transmitting and receiving data and/or signals wirelessly. In some embodiments, the antenna 762 may comprise one or more omni-directional, sector, or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 762 may be separate from the network node 760 and may be connectable to the network node 760 through an interface or port.

The antenna 762, the interface 790, and/or the processing circuitry 770 may be configured to perform any receiving operations and/or certain obtaining operations described herein as being performed by a network node. Any information, data, and/or signals may be received from a WD, another network node, and/or any other network equipment. Similarly, the antenna 762, the interface 790, and/or the processing circuitry 770 may be configured to perform any transmitting operations described herein as being performed by a network node. Any information, data, and/or signals may be transmitted to a WD, another network node, and/or any other network equipment.

The power circuitry 787 may comprise, or be coupled to, power management circuitry and is configured to supply the components of the network node 760 with power for performing the functionality described herein. The power circuitry 787 may receive power from the power source 786. The power source 786 and/or the power circuitry 787 may be configured to provide power to the various components of the network node 760 in a form suitable for the respective components (e.g., at a voltage and current level needed for each respective component). The power source 786 may either be included in, or be external to, the power circuitry 787 and/or the network node 760. For example, the network node 760 may be connectable to an external power source (e.g., an electricity outlet) via an input circuitry or interface such as an electrical cable, whereby the external power source supplies power to the power circuitry 787. As a further example, the power source 786 may comprise a source of power in the form of a battery or battery pack which is connected to, or integrated in, the power circuitry 787. The battery may provide backup power should the external power source fail. Other types of power sources, such as photovoltaic devices, may also be used.

Alternative embodiments of the network node 760 may include additional components beyond those shown in FIG. 7 that may be responsible for providing certain aspects of the network node's functionality, including any of the functionality described herein and/or any functionality necessary to support the subject matter described herein. For example, the network node 760 may include user interface equipment to allow input of information into the network node 760 and to allow output of information from the network node 760. This may allow a user to perform diagnostic, maintenance, repair, and other administrative functions for the network node 760.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, LEE, LME, a smart device, a wireless CPE, a vehicle mounted wireless terminal device, etc. A WD may support D2D communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a M2M device, which may in a 3GPP context be referred to as a MTC device. As one particular example, the WD may be a UE implementing the 3GPP NB-IoT standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 7, a WD 710 includes an antenna 711, an interface 714, processing circuitry 720, a device readable medium 730, user interface equipment 732, auxiliary equipment 734, a power source 736, and power circuitry 737. The WD 710 may include multiple sets of one or more of the illustrated components for different wireless technologies supported by the WD 710, such as, for example, GSM, WCDMA, LTE, NR, WiFi, WiMAX, or Bluetooth wireless technologies, just to mention a few. These wireless technologies may be integrated into the same or different chips or set of chips as other components within the WD 710.

The antenna 711 may include one or more antennas or antenna arrays configured to send and/or receive wireless signals and is connected to the interface 714. In certain alternative embodiments, the antenna 711 may be separate from the WD 710 and be connectable to the WD 710 through an interface or port. The antenna 711, the interface 714, and/or the processing circuitry 720 may be configured to perform any receiving or transmitting operations described herein as being performed by a WD. Any information, data, and/or signals may be received from a network node and/or another WD. In some embodiments, radio front end circuitry and/or the antenna 711 may be considered an interface.

As illustrated, the interface 714 comprises radio front end circuitry 712 and the antenna 711. The radio front end circuitry 712 comprises one or more filters 718 and amplifiers 716. The radio front end circuitry 712 is connected to the antenna 711 and the processing circuitry 720 and is configured to condition signals communicated between the antenna 711 and the processing circuitry 720. The radio front end circuitry 712 may be coupled to or be a part of the antenna 711. In some embodiments, the WD 710 may not include separate radio front end circuitry 712; rather, the processing circuitry 720 may comprise radio front end circuitry and may be connected to the antenna 711. Similarly, in some embodiments, some or all of RF transceiver circuitry 722 may be considered a part of the interface 714. The radio front end circuitry 712 may receive digital data that is to be sent out to other network nodes or WDs via a wireless connection. The radio front end circuitry 712 may convert the digital data into a radio signal having the appropriate channel and bandwidth parameters using a combination of the filters 718 and/or the amplifiers 716. The radio signal may then be transmitted via the antenna 711. Similarly, when receiving data, the antenna 711 may collect radio signals which are then converted into digital data by the radio front end circuitry 712. The digital data may be passed to the processing circuitry 720. In other embodiments, the interface 714 may comprise different components and/or different combinations of components.

The processing circuitry 720 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 710 components, such as the device readable medium 730, WD 710 functionality. Such functionality may include providing any of the various wireless features or benefits discussed herein. For example, the processing circuitry 720 may execute instructions stored in the device readable medium 730 or in memory within the processing circuitry 720 to provide the functionality disclosed herein.

As illustrated, the processing circuitry 720 includes one or more of the RF transceiver circuitry 722, baseband processing circuitry 724, and application processing circuitry 726. In other embodiments, the processing circuitry 720 may comprise different components and/or different combinations of components. In certain embodiments, the processing circuitry 720 of the WD 710 may comprise a SOC. In some embodiments, the RF transceiver circuitry 722, the baseband processing circuitry 724, and the application processing circuitry 726 may be on separate chips or sets of chips. In alternative embodiments, part or all of the baseband processing circuitry 724 and the application processing circuitry 726 may be combined into one chip or set of chips, and the RF transceiver circuitry 722 may be on a separate chip or set of chips. In still alternative embodiments, part or all of the RF transceiver circuitry 722 and the baseband processing circuitry 724 may be on the same chip or set of chips, and the application processing circuitry 726 may be on a separate chip or set of chips. In yet other alternative embodiments, part or all of the RF transceiver circuitry 722, the baseband processing circuitry 724, and the application processing circuitry 726 may be combined in the same chip or set of chips. In some embodiments, the RF transceiver circuitry 722 may be a part of the interface 714. The RF transceiver circuitry 722 may condition RF signals for the processing circuitry 720.

In certain embodiments, some or all of the functionality described herein as being performed by a WD may be provided by the processing circuitry 720 executing instructions stored on the device readable medium 730, which in certain embodiments may be a computer-readable storage medium. In alternative embodiments, some or all of the functionality may be provided by the processing circuitry 720 without executing instructions stored on a separate or discrete device readable storage medium, such as in a hard-wired manner. In any of those particular embodiments, whether executing instructions stored on a device readable storage medium or not, the processing circuitry 720 can be configured to perform the described functionality. The benefits provided by such functionality are not limited to the processing circuitry 720 alone or to other components of the WD 710, but are enjoyed by the WD 710 as a whole, and/or by end users and the wireless network generally.

The processing circuitry 720 may be configured to perform any determining, calculating, or similar operations (e.g., certain obtaining operations) described herein as being performed by a WD. These operations, as performed by the processing circuitry 720, may include processing information obtained by the processing circuitry 720 by, for example, converting the obtained information into other information, comparing the obtained information or converted information to information stored by the WD 710, and/or performing one or more operations based on the obtained information or converted information, and as a result of said processing making a determination.

The device readable medium 730 may be operable to store a computer program; software; an application including one or more of logic, rules, code, tables, etc.; and/or other instructions capable of being executed by the processing circuitry 720. The device readable medium 730 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 720. In some embodiments, the processing circuitry 720 and the device readable medium 730 may be considered to be integrated.

The user interface equipment 732 may provide components that allow for a human user to interact with the WD 710. Such interaction may be of many forms, such as visual, audial, tactile, etc. The user interface equipment 732 may be operable to produce output to the user and to allow the user to provide input to the WD 710. The type of interaction may vary depending on the type of user interface equipment 732 installed in the WD 710. For example, if the WD 710 is a smart phone, the interaction may be via a touch screen; if the WD 710 is a smart meter, the interaction may be through a screen that provides usage (e.g., the number of gallons used) or a speaker that provides an audible alert (e.g., if smoke is detected). The user interface equipment 732 may include input interfaces, devices and circuits, and output interfaces, devices and circuits. The user interface equipment 732 is configured to allow input of information into the WD 710, and is connected to the processing circuitry 720 to allow the processing circuitry 720 to process the input information. The user interface equipment 732 may include, for example, a microphone, a proximity or other sensor, keys/buttons, a touch display, one or more cameras, a USB port, or other input circuitry. The user interface equipment 732 is also configured to allow output of information from the WD 710 and to allow the processing circuitry 720 to output information from the WD 710. The user interface equipment 732 may include, for example, a speaker, a display, vibrating circuitry, a USB port, a headphone interface, or other output circuitry. Using one or more input and output interfaces, devices, and circuits of the user interface equipment 732, the WD 710 may communicate with end users and/or the wireless network, and allow them to benefit from the functionality described herein.

The auxiliary equipment 734 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 734 may vary depending on the embodiment and/or scenario.

The power source 736 may, in some embodiments, be in the form of a battery or battery pack. Other types of power sources, such as an external power source (e.g., an electricity outlet), photovoltaic devices, or power cells may also be used. The WD 710 may further comprise the power circuitry 737 for delivering power from the power source 736 to the various parts of the WD 710 which need power from the power source 736 to carry out any functionality described or indicated herein. The power circuitry 737 may in certain embodiments comprise power management circuitry. The power circuitry 737 may additionally or alternatively be operable to receive power from an external power source, in which case the WD 710 may be connectable to the external power source (such as an electricity outlet) via input circuitry or an interface such as an electrical power cable. The power circuitry 737 may also in certain embodiments be operable to deliver power from an external power source to the power source 736. This may be, for example, for the charging of the power source 736. The power circuitry 737 may perform any formatting, converting, or other modification to the power from the power source 736 to make the power suitable for the respective components of the WD 710 to which power is supplied.

Figure 8:
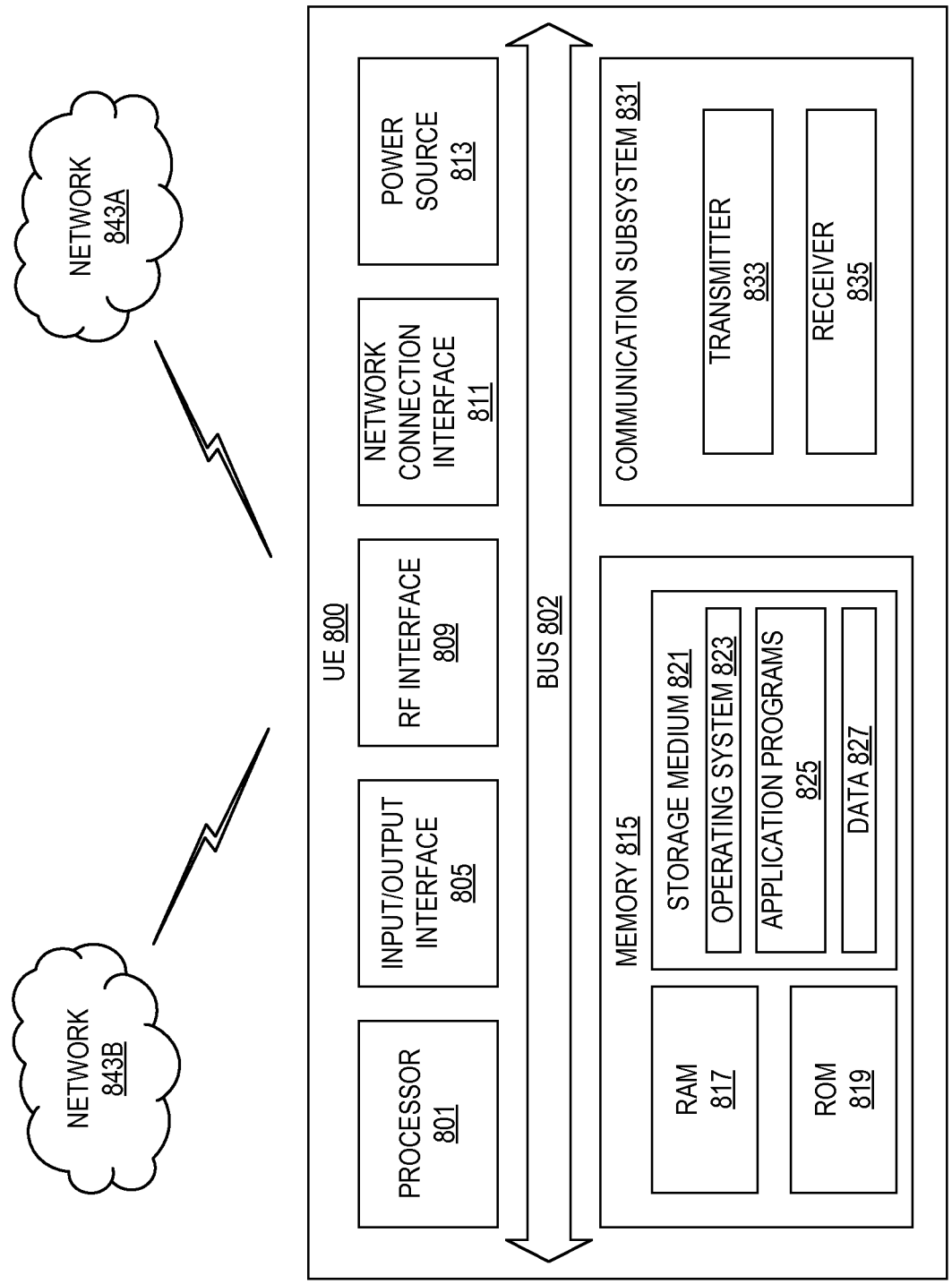
FIG. 8 illustrates one embodiment of a UE in accordance with various aspects described herein.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 800 may be any UE identified by 3GPP, including a NB-IoT UE, a MTC UE, and/or an enhanced MTC (eMTC) UE. The UE 800, as illustrated in FIG. 8, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, the UE 800 includes processing circuitry 801 that is operatively coupled to an input/output interface 805, an RF interface 809, a network connection interface 811, memory 815 including RAM 817, ROM 819, and a storage medium 821 or the like, a communication subsystem 831, a power source 813, and/or any other component, or any combination thereof. The storage medium 821 includes an operating system 823, an application program 825, and data 827. In other embodiments, the storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, the processing circuitry 801 may be configured to process computer instructions and data. The processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 801 may include two CPUs. Data may be information in a form suitable for use by a computer.

In the depicted embodiment, the input/output interface 805 may be configured to provide a communication interface to an input device, output device, or input and output device. The UE 800 may be configured to use an output device via the input/output interface 805. An output device may use the same type of interface port as an input device. For example, a USB port may be used to provide input to and output from the UE 800. The output device may be a speaker, a sound card, a video card, a display, a monitor, a printer, an actuator, an emitter, a smartcard, another output device, or any combination thereof. The UE 800 may be configured to use an input device via the input/output interface 805 to allow a user to capture information into the UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, the RF interface 809 may be configured to provide a communication interface to RF components such as a transmitter, a receiver, and an antenna. The network connection interface 811 may be configured to provide a communication interface to a network 843A. The network 843A may encompass wired and/or wireless networks such as a LAN, a WAN, a computer network, a wireless network, a telecommunications network, another like network or any combination thereof. For example, the network 843A may comprise a WiFi network. The network connection interface 811 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 811 may implement receiver and transmitter functionality appropriate to the communication network links (e.g., optical, electrical, and the like). The transmitter and receiver functions may share circuit components, software, or firmware, or alternatively may be implemented separately.

The RAM 817 may be configured to interface via a bus 802 to the processing circuitry 801 to provide storage or caching of data or computer instructions during the execution of software programs such as the operating system, application programs, and device drivers. The ROM 819 may be configured to provide computer instructions or data to the processing circuitry 801. For example, the ROM 819 may be configured to store invariant low-level system code or data for basic system functions such as basic Input and Output (I/O), startup, or reception of keystrokes from a keyboard that are stored in a non-volatile memory. The Storage medium 821 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 821 may be configured to include the operating system 823, the application program 825 such as a web browser application, a widget or gadget engine, or another application, and the data file 827. The storage medium 821 may store, for use by the UE 800, any of a variety of various operating systems or combinations of operating systems.

The storage medium 821 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 821 may allow the UE 800 to access computer-executable instructions, application programs, or the like, stored on transitory or non-transitory memory media, to off-load data or to upload data. An article of manufacture, such as one utilizing a communication system, may be tangibly embodied in the storage medium 821, which may comprise a device readable medium.

In FIG. 8, the processing circuitry 801 may be configured to communicate with a network 843B using the communication subsystem 831. The network 843A and the network 843B may be the same network or networks or different network or networks. The communication subsystem 831 may be configured to include one or more transceivers used to communicate with the network 843B. For example, the communication subsystem 831 may be configured to include one or more transceivers used to communicate with one or more remote transceivers of another device capable of wireless communication such as another WD, UE, or base station of a Radio Access Network (RAN) according to one or more communication protocols, such as IEEE 802.8, Code Division Multiple Access (CDMA), WCDMA, GSM, LTE, Universal Terrestrial RAN (UTRAN), WiMax, or the like. Each transceiver may include a transmitter 833 and/or a receiver 835 to implement transmitter or receiver functionality, respectively, appropriate to the RAN links (e.g., frequency allocations and the like). Further, the transmitter 833 and the receiver 835 of each transceiver may share circuit components, software, or firmware, or alternatively may be implemented separately.

In the illustrated embodiment, the communication functions of the communication subsystem 831 may include data communication, voice communication, multimedia communication, short-range communications such as Bluetooth, near-field communication, location-based communication such as the use of the GPS to determine a location, another like communication function, or any combination thereof. For example, the communication subsystem 831 may include cellular communication, WiFi communication, Bluetooth communication, and GPS communication. The network 843B may encompass wired and/or wireless networks such as a LAN, a WAN, a computer network, a wireless network, a telecommunications network, another like network, or any combination thereof. For example, the network 843B may be a cellular network, a WiFi network, and/or a near-field network. A power source 813 may be configured to provide Alternating Current (AC) or Direct Current (DC) power to components of the UE 800.

The features, benefits, and/or functions described herein may be implemented in one of the components of the UE 800 or partitioned across multiple components of the UE 800. Further, the features, benefits, and/or functions described herein may be implemented in any combination of hardware, software, or firmware. In one example, the communication subsystem 831 may be configured to include any of the components described herein. Further, the processing circuitry 801 may be configured to communicate with any of such components over the bus 802. In another example, any of such components may be represented by program instructions stored in memory that, when executed by the processing circuitry 801, perform the corresponding functions described herein. In another example, the functionality of any of such components may be partitioned between the processing circuitry 801 and the communication subsystem 831. In another example, the non-computationally intensive functions of any of such components may be implemented in software or firmware and the computationally intensive functions may be implemented in hardware.

Figure 9:
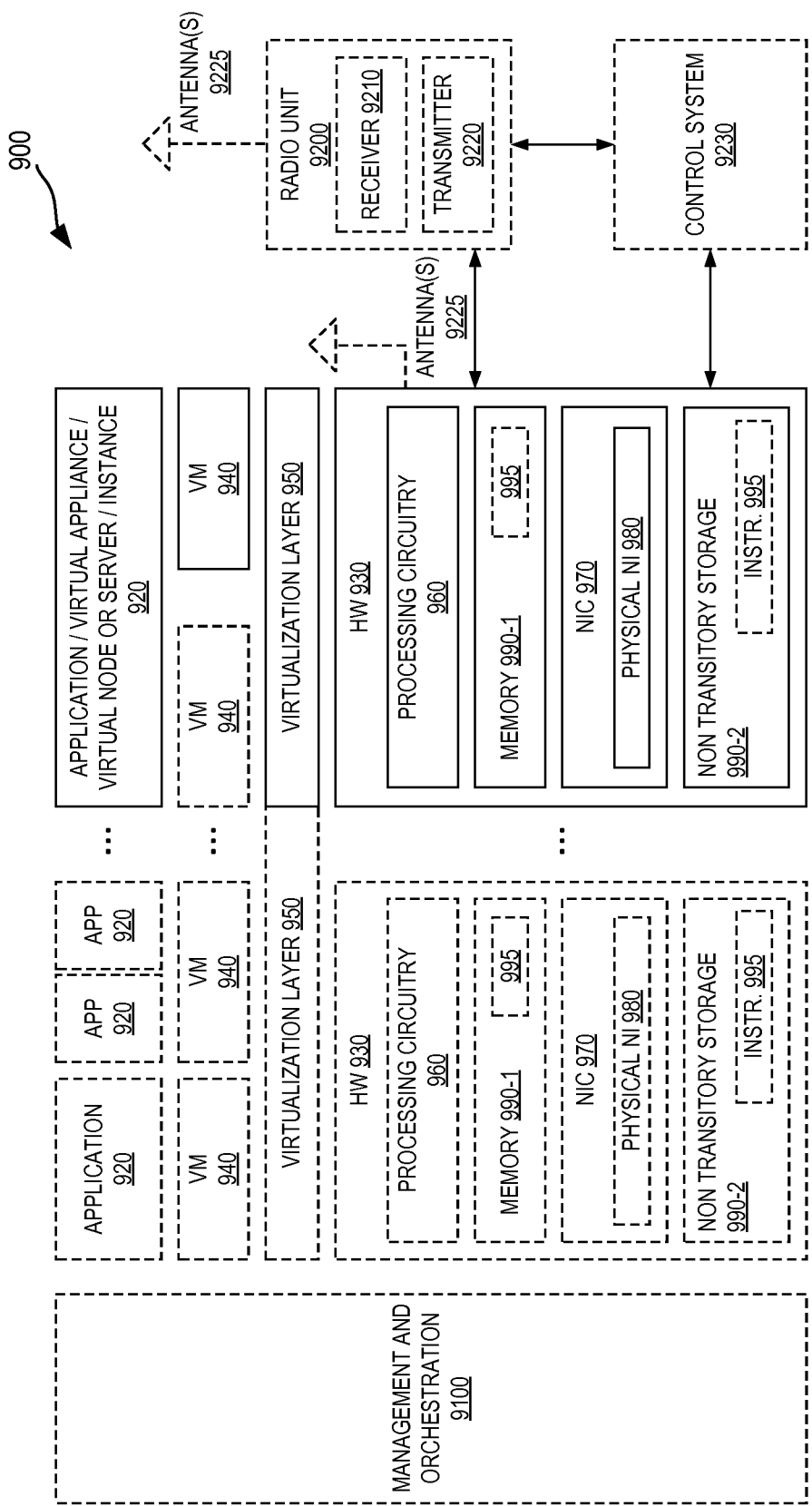
FIG. 9 is a schematic block diagram illustrating a virtualization environment in which functions implemented by some embodiments may be virtualized.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. The applications 920 are run in the virtualization environment 900 which provides hardware 930 comprising processing circuitry 960 and memory 990. The memory 990 contains instructions 995 executable by the processing circuitry 960 whereby the application 920 is operative to provide one or more of the features, benefits, and/or functions disclosed herein.

The virtualization environment 900 comprises general-purpose or special-purpose network hardware devices 930 comprising a set of one or more processors or processing circuitry 960, which may be Commercial Off-the-Shelf (COTS) processors, dedicated ASICs, or any other type of processing circuitry including digital or analog hardware components or special purpose processors. Each hardware device 930 may comprise memory 990-1 which may be non-persistent memory for temporarily storing instructions 995 or software executed by the processing circuitry 960. Each hardware device 930 may comprise one or more Network Interface Controllers (NICs) 970, also known as network interface cards, which include a physical network interface 980. Each hardware device 930 may also include non-transitory, persistent, machine-readable storage media 990-2 having stored therein software 995 and/or instructions executable by the processing circuitry 960. The software 995 may include any type of software including software for instantiating one or more virtualization layers 950 (also referred to as hypervisors), software to execute virtual machines 940, as well as software allowing it to execute functions, features, and/or benefits described in relation with some embodiments described herein.

The virtual machines 940, comprise virtual processing, virtual memory, virtual networking or interface, and virtual storage, and may be run by a corresponding virtualization layer 950 or hypervisor. Different embodiments of the instance of virtual appliance 920 may be implemented on one or more of the virtual machines 940, and the implementations may be made in different ways.

During operation, the processing circuitry 960 executes the software 995 to instantiate the hypervisor or virtualization layer 950, which may sometimes be referred to as a Virtual Machine Monitor (VMM). The virtualization layer 950 may present a virtual operating platform that appears like networking hardware to the virtual machine 940.

As shown in FIG. 9, the hardware 930 may be a standalone network node with generic or specific components. The hardware 930 may comprise an antenna 9225 and may implement some functions via virtualization. Alternatively, the hardware 930 may be part of a larger cluster of hardware (e.g., such as in a data center or CPE) where many hardware nodes work together and are managed via a Management and Orchestration (MANO) 9100, which, among others, oversees lifecycle management of the applications 920.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 940 may be a software implementation of a physical machine that runs programs as if they were executing on a physical, non-virtualized machine. Each of the virtual machines 940, and that part of the hardware 930 that executes that virtual machine 940, be it hardware dedicated to that virtual machine 940 and/or hardware shared by that virtual machine 940 with others of the virtual machines 940, forms a separate Virtual Network Element (VNE).

Still in the context of NFV, Virtual Network Function (VNF) is responsible for handling specific network functions that run in one or more virtual machines 940 on top of the hardware networking infrastructure 930 and corresponds to the application 920 in FIG. 9.

In some embodiments, one or more radio units 9200 that each include one or more transmitters 9220 and one or more receivers 9210 may be coupled to the one or more antennas 9225. The radio units 9200 may communicate directly with the hardware nodes 930 via one or more appropriate network interfaces and may be used in combination with the virtual components to provide a virtual node with radio capabilities, such as a radio access node or a base station.

In some embodiments, some signaling can be effected with the use of a control system 9230, which may alternatively be used for communication between the hardware nodes 930 and the radio unit 9200.

Figure 10:
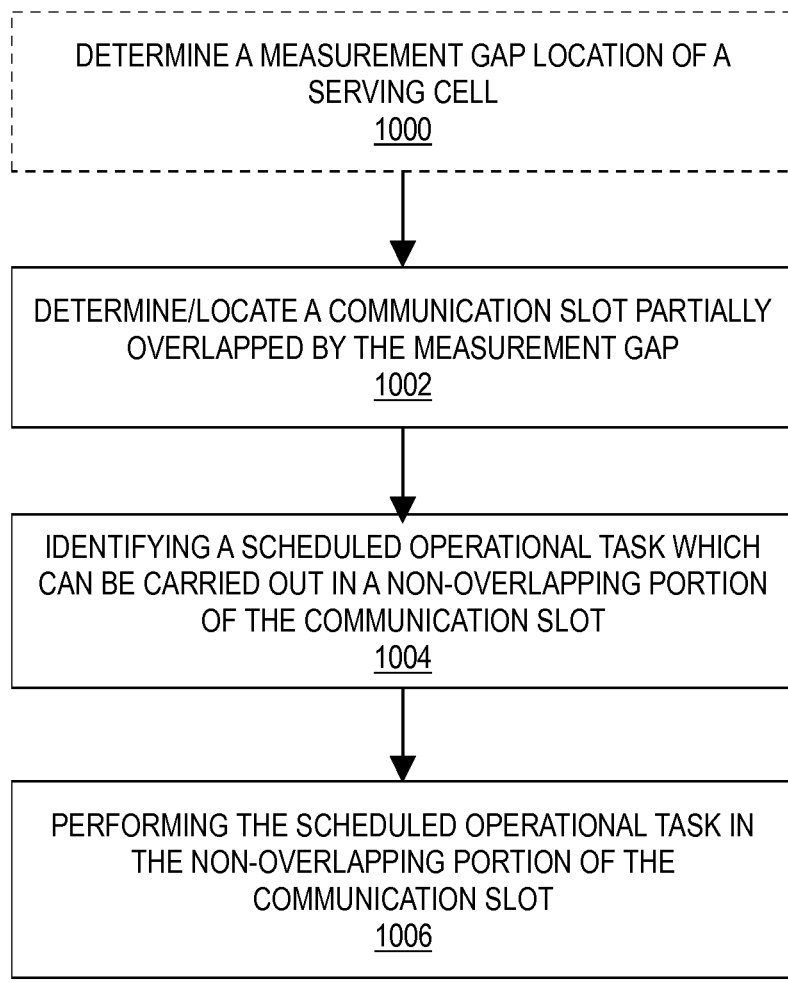
FIG. 10 is a flow chart that illustrates the operation of a UE in accordance with some embodiments of the present disclosure.

FIG. 10 depicts a method in accordance with particular embodiments. Dashed boxes represent optional steps. This method may be performed by a UE. The method begins at step 1000 with determining one or more measurement gap locations (e.g., for an uplink and/or downlink) of a serving cell. The method also includes step 1002 with determining/locating a communication slot associated with the serving cell which is partially overlapped by the measurement gap. The method also includes step 1004 with identifying a scheduled operational task which can be carried out in a portion of the communication slot not overlapped by the measurement gap. The method also includes step 1006 with performing the scheduled operational task in the portion of the communication slot not overlapped by the measurement gap, as described with respect to any of the embodiments described above. Additional details regarding each of the steps 1000 to 1006 are described above and, while not repeated here, are to be understood as being applicable to the process of FIG. 10.

In some embodiments, determining the communications slot in step 400 comprises determining a set of measurement gap locations for an uplink and/or downlink of the serving cell and determining a set of communications slots which are overlapped by at least one of the set of measurement gaps. Further, in some embodiments, determining the communication slot that is partially overlapped by the measurement gap comprises determining the set of communications slots which are overlapped by at least one of the set of measurement gaps based on a duplex mode and/or a slot pattern of the serving cell.

In some embodiments, the serving cell is configured in TDD, and determining the communications slot in step 400 comprises determining the communication slot of the serving cell which is partially overlapped by the measurement gap based on whether the TDD configuration for the communication slot is uplink, downlink, or flexible.

In some embodiments, determining the measurement gap in step 1000 is based on a measurement gap configuration and a protocol established for the serving cell by a base station. Further, in some embodiments, the method further comprises receiving the measurement gap configuration (not shown). Further, in some embodiments, in order to determine the measurement gap location of the measurement gap and to determine the communication slot partially overlapped by the measurement gap, the method further comprises determining a timing reference used for the measurement gap configuration on the carrier associated with the serving cell and determining a set of communication slots on the serving cell that are partially overlapped by the measurement gap based on the timing reference. In some embodiments, the method further comprises determining, for each of the set of communication slots partially overlapped by the measurement gap, the portion of the communication slot not overlapped by the measurement gap. Further, in some embodiments, identifying the scheduled operational task in step 1004 comprises identifying, for each of the set of communication slots partially overlapped by the measurement gap, the scheduled operational task which can be carried out in the portion of the communication slot not overlapped by the measurement gap.

Figure 11:
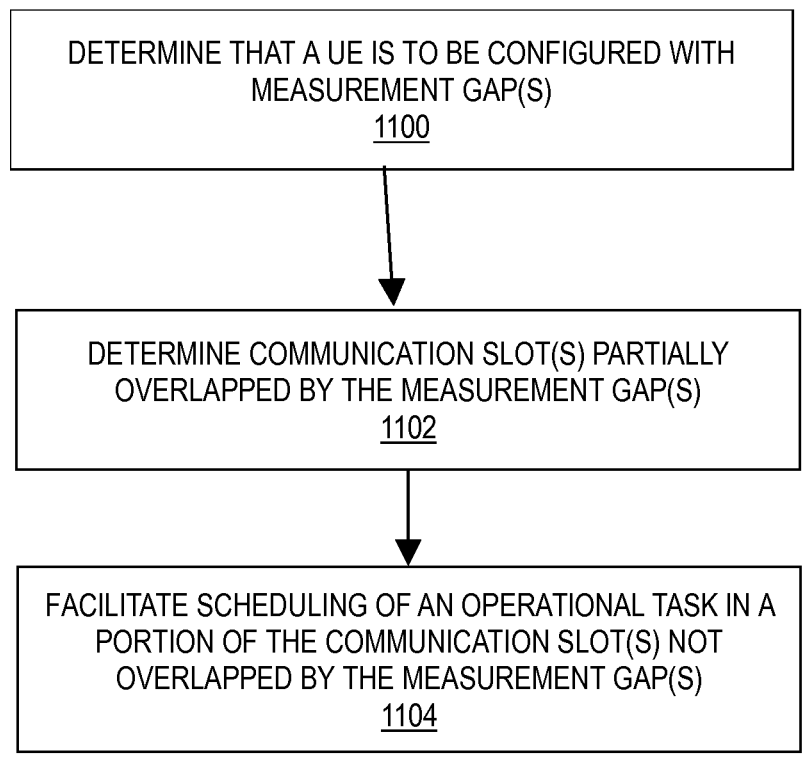
FIG. 11 is a flow chart that illustrates the operation of a network node (e.g., a base station) in accordance with some embodiments of the present disclosure.

FIG. 11 depicts a method in accordance with particular embodiments. This method may be performed by a base station. The method begins at step 1100 with determining that a UE associated with the serving cell is to be configured with measurement gap(s). The method also includes step 1102 with determining communication slot(s) partially overlapped by the measurement gap(s). The method also includes step 1104 with facilitating scheduling of an operational task in a portion of the communication slot(s) not overlapped by the measurement gap(s), as described with respect to any of the embodiments described above. Additional details regarding each of the steps 1100 to 1104 are described above and, while not repeated here, are to be understood as being applicable to the process of FIG. 11.

In some embodiments, determining the communication slot(s) partially overlapped by the measurement gap(s) in step 1102 comprises determining, based on numerology in use (e.g., SCS, slot length, etc.) in the serving cell and/or a measurement gap configuration, the communication slot(s) partially overlapped by the measurement gap(s) for the UE on downlink and determining a portion of the communication slot(s) which will be non-overlapped by the measurement gap(s) (e.g., before and after gap(s)). Further, in some embodiments, the measurement gap configuration comprises an MGTA.

In some embodiments, facilitating scheduling of the operation task in the portion of the communication slot(s) not overlapped by the measurement gap(s) in step 1104 comprises adjusting, via RRC signaling, a set of monitored PDCCH time domain instants and/or PDSCH time domain resource allocations, such that at least a subset of partially overlapped slots can be utilized for scheduling on downlink.

In some embodiments, determining the communication slot(s) partially overlapped by the measurement gap(s) in step 1102 comprises determining, based on numerology (e.g., SCS, slot length, etc.) in use in the serving cell, measurement gap configuration, and/or uplink-downlink TA for the UE, whether the partially overlapped communication slot(s) will arise on uplink and determining a portion of the communication slot(s) which will be non-overlapped by the measurement gap (e.g., before and after gap).

In some embodiments, facilitating scheduling of the operation task in the portion of the communication slot(s) not overlapped by the measurement gap(s) in step 1104 comprises adjusting, via RRC signaling, a set of PUSCH time domain resource allocations, such that at least a subset of partially overlapped slots can be utilized for scheduling on uplink.

In some embodiments, facilitating scheduling of the operation task in the portion of the communication slot(s) not overlapped by the measurement gap(s) in step 1104 comprises adjusting, via RRC signaling, time domain resources for SRS.

In some embodiments, facilitating scheduling of the operation task in the portion of the communication slot(s) not overlapped by the measurement gap(s) in step 1104 comprises adjusting, via RRC signaling, time domain resources used for at least one format of PUCCH.

In some embodiments, facilitating scheduling of the operation task in the portion of the communication slot(s) not overlapped by the measurement gap(s) in step 1104 comprises scheduling the UE in the partially overlapped slot(s), with time domain resource allocation configurations that have been prepared for the same.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following is one example implementation of some aspects of the present disclosure as a Change Request (CR) to 3GPP Technical Specification (TS) 38.133 V 15.3.0:

Unchanged Sections Omitted

First Change 9.1.2 Measurement Gap

If the UE requires measurement gaps to identify and measure intra-frequency cells and/or inter-frequency cells and/or inter-RAT E-UTRAN cells, and the UE does not support independent measurement gap patterns for different frequency ranges as specified in Table 5.1-1 in [18, 19, 20], in order for the requirements in the following subsections to apply the network must provide a single per-UE measurement gap pattern for concurrent monitoring of all frequency layers.

If the UE requires measurement gaps to identify and measure intra-frequency cells and/or inter-frequency cells and/or inter-RAT E-UTRAN cells, and the UE supports independent measurement gap patterns for different frequency ranges as specified in Table 5.1-1 in [18, 19, 20], in order for the requirements in the following subsections to apply the network must provide either per-FR measurement gap patterns for frequency range where UE requires per-FR measurement gap for concurrent monitoring of all frequency layers of each frequency range independently, or a single per-UE measurement gap pattern for concurrent monitoring of all frequency layers of all frequency ranges.

During the per-UE measurement gaps the UE:

is not required to conduct reception/transmission from/to the corresponding E-UTRAN PCell, E-UTRAN SCell(s) and NR serving cells for NSA except the reception of signals used for RRM measurement is not required to conduct reception/transmission from/to the corresponding NR serving cells for SA except the reception of signals used for RRM measurement During the per-FR measurement gaps the UE:

is not required to conduct reception/transmission from/to the corresponding E-UTRAN PCell, E-UTRAN SCell(s) and NR serving cells in the corresponding frequency range for NSA except the reception of signals used for RRM measurement is not required to conduct reception/transmission from/to the corresponding NR serving cells in the corresponding frequency range for SA except the reception of signals used for RRM measurement In slots that are partially overlapped by per-UE or per-FR measurement gaps the UE:

shall receive channels and signals for which time domain resource allocations are comprised in the non-overlapped part of the slot shall transmit channels and signals for which time domain resource allocations are comprised in the non-overlapped part of the slot UEs shall support the measurement gap patterns listed in Table 9.1.2-1 based on the applicability specified in table 9.1.2-2 and 9.1.2-3. UE determines measurement gap timing based on gap offset configuration and measurement gap timing advance configuration provided by higher layer signalling as specified in [2] and [16].

TABLE 9.1.2-1

Gap Pattern Configurations

| Gap Pattern Id | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

TABLE 9.1.2-2

Applicability for Gap Pattern Configurations
supported by the E-UTRA-NR dual connectivity UE

| Measurement gap pattern configuration | Serving cell | Measurement Purpose | Applicable Gap Pattern Id |
|---|---|---|---|
| Per-UE measurement gap | E-UTRA + FR1, or | non-NR RAT[Note1,2] | 0, 1, 2, 3 |
| | E-UTRA + FR2, or | FR1 and/or FR2 | 0-11 |
| | E-UTRA + FR1 + FR2 | non-NR RAT[Note1,2] and FR1 and/or FR2 | 0, 1, 2, 3 |
| Per FR measurement gap | E-UTRA and, FR1 if configured FR2 if configured | non-NR RAT Note[1,2] | 0, 1, 2, 3 |
| | | | No gap |
| | E-UTRA and, FR1 if configured FR2 if configured | FR1 only | 0-11 |
| | | | No gap |
| | E-UTRA and, FR1 if configured FR2 if configured | FR2 only | No gap |
| | | | 12-23 |
| | E-UTRA and, FR1 if configured FR2 if configured | non-NR RAT[Note1,2] and FR1 | 0, 1, 2, 3 |
| | | | No gap |
| | E-UTRA and, FR1 if configured FR2 if configured | FR1 and FR2 | 0-11 |
| | | | 12-23 |
| | E-UTRA and, FR1 if configured FR2 if configured | non-NR RAT[Note1,2] and FR2 | 0, 1, 2, 3 |
| | | | 12-23 |
| | E-UTRA and, FR1 if configured FR2 if configured | non-NR RAT[Note1,2] and FR1 and FR2 | 0, 1, 2, 3 |
| | | | 12-23 |

Note:
if GSM or UTRA TDD or UTRA FDD inter-RAT frequency layer is configured to be monitered, only measurement gap pattern #0 and #1 can be used for per-FR gap in E-UTRA and FR1 if configured, or for per-UE gap.
NOTE1:
Non-NR RAT includes E-UTRA, UTRA and/or GSM.
NOTE2:
The gap pattern 2 and 3 are supported by UEs which support shortMeasurementGap-r14.
NOTE3:
When E-UTRA inter-frequency RSTD measurements are configured and the UE requires measurement gaps for performing such measurements, only Gap Pattern #0 can be used.
NOTE4:
If per-UE measurement gap is configured with MG timing advance of 0 ms, a measurement gap starts at the end of the latest LTE subframe occurring immediately before the measurement gap among MCG serving cells subframes. If per-FR measurenet gap for FR1 is configured with MG timing advance of 0 ms, this measurement gap for FR1 starts at the end of the latest LTE subframe occurring immediately before the measurement gap among MCG serving cells subframes in FR1. If per-FR measurenet gap for FR2 is configured with MG timing advance of 0ms, this measurement gap for FR2 starts at [FFS]. Measurement gap starting point is [FFS] if MG timing advance is 0.5 ms or 0.25 ms For per-FR measurement gap capable UE configured with E-UTRA-NR dual connectivity, when serving cells are in E-UTRA and FR1, measurement objects are in both E-UTRA/FR1 and FR2,
  If MN indicates UE that the measurement gap from MN applies to E-UTRA/FR1I/FR2 serving cells, UE fulfils the per-UE measurement requirements for both E-UTRA/FR1 and FR2 measurement objects based on the measurement gap pattern configured by MN;
  If MN indicates UE that the measurement gap from MN applies to only LTE/FR1 serving cell(s),
    UE fulfils the measurement requirements for FRU/LTE measurement objects based on the configured measurement gap pattern;
    UE fulfils the requirements for FR2 measurement objects based on effective MGRP=20 ms;
For per-FR measurement gap capable UE, when serving cells are in E-UTRA, FR and FR2, or in E-UTRA and FR2, measurement objects are in both E-UTRA/FR1 and FR2,
  If MN indicates UE that the measurement gap from MN applies to E-UTRA/FR1/FR2 serving cells, UE fulfils the per-UE measurement requirements for both E-UTRA/FR1 and FR2 measurement objects based on the measurement gap pattern configured by MN.

TABLE 9.1.2-3

Applicability for Gap Pattern Configurations
supported by the UE with NR standalone operation

| Measurement gap pattern configuration | Serving cell | Measurement Purpose[NOTE2] | Applicable Gap Pattern Id |
|---|---|---|---|
| Per-UE measurement gap | FR1, or | E-UTRA only[NOTE3] | 0, 1, 2, 3 |
| | FR1 + FR2 | FR1 and/or FR2 | 0-11 |
| | | E-UTRAN and FR1 and/or FR2[NOTE3] | 0, 1, 2, 3 |
| | FR2 | E-UTRA only[NOTE3] | 0, 1, 2, 3 |
| | | FR1 only | 0-11 |
| | | FR1 and FR2 | 0-11 |
| | | E-UTRAN and FR1 and/or FR2[NOTE3] | 0, 1, 2, 3 |
| | | FR2 only | 12-23 |
| Per FR measurement gap | FR1 if configured | E-UTRA only[NOTE3] | 0, 1, 2, 3 |
| | FR2 if configured | | No gap |
| | FR1 if configured | FR1 only | v0-11 |
| | FR2 if configured | | No gap |
| | FR1 if configured | FR2 only | No gap |
| | FR2 if configured | | 12-23 |
| | FR1 if configured | E-UTRA and FR1[NOTE3] | 0, 1, 2, 3 |
| | FR2 if configured | | No gap |
| | FR1 if configured | FR1 and FR2 | 0-11 |
| | FR2 if configured | | 12-23 |
| | FR1 if configured | E-UTRA and FR2[NOTE3] | 0, 1, 2, 3 |
| | FR2 if configured | | 12-23 |
| | FR1 if configured | E-UTRA and FR1 and FR2[NOTE3] | 0, 1, 2, 3 |
| | FR2 if configured | | 12-23 |

NOTE1:
When E-UTRA inter-RAT RSTD measurements are configured and the UE requires measurement gaps for performing such measurements, only Gap Pattern #0 can be used.
NOTE2:
Measurement purpose which includes E-UTRA measurements includes also inter-RAT E-UTRA RSRP and RSRQ measurements for E-CID
NOTE3:
Editor's note: a note to be added in Table 9.1.2-3 on that measurement gap patterns #2 and #3 are supported only by the UEs which have a corresponding capability of short measurement gap once RAN2 specifies the capability.
NOTE4:
Starting point of measurement gap for SA is [FFS] . . .

For per-FR measurement gap capable UE in NR standalone operation, for per-FR gap based measurement, when there is no serving cell in a particular FR, where measurements objects are configured, regardless if explicit per-FR measurement gap is configured in this FR, the effective MGRP in this FR used to determine requirements;
  20 ms for FR2 NR measurements
  40 ms for FR1 NR measurements
  40 ms for LTE measurements
  40 ms for FR1+LTE measurements
  If measurement gap is configured in one FR but measurement object is not configured in the FR, the scheduling opportunity in the FR depends on the configured measurement gap pattern.
  For E-UTRA-NR dual connectivity, if UE is not capable of per-FR-gap, total interruption time on SCG during MGL is defined only when MGL(N)=6 ms, 4 ms and 3 ms. And if UE is capable of per-FR-gap, total interruption time on FR1 serving cells in SCG during MGL is defined only when MGL(N)=6 ms, 4 ms and 3 ms, and total interruption time on FR2 serving cells in SCG during MGL is defined only when MGL(N)=5.5 ms, 3.5 ms and 1.5 ms, given that the reference time for per-FR gap in FR2 is based on an FR2 serving cell.
  For NR standalone, if UE is not capable of per-FR-gap, total interruption time on a serving cell during MGL is defined only when MGL(N)=6 ms, 4 ms and 3 ms. And if UE is capable of per-FR-gap, total interruption time on FR1 serving cells during MGL is defined only when MGL(N)=6 ms, 4 ms and 3 ms, and total interruption time on FR2 serving cells during MGL is defined only when MGL(N)=5.5 ms, 3.5 ms and 1.5 ms, given that the reference time for per-FR gap in FR2 is based on an FR2 serving cell.

Figure 12A:
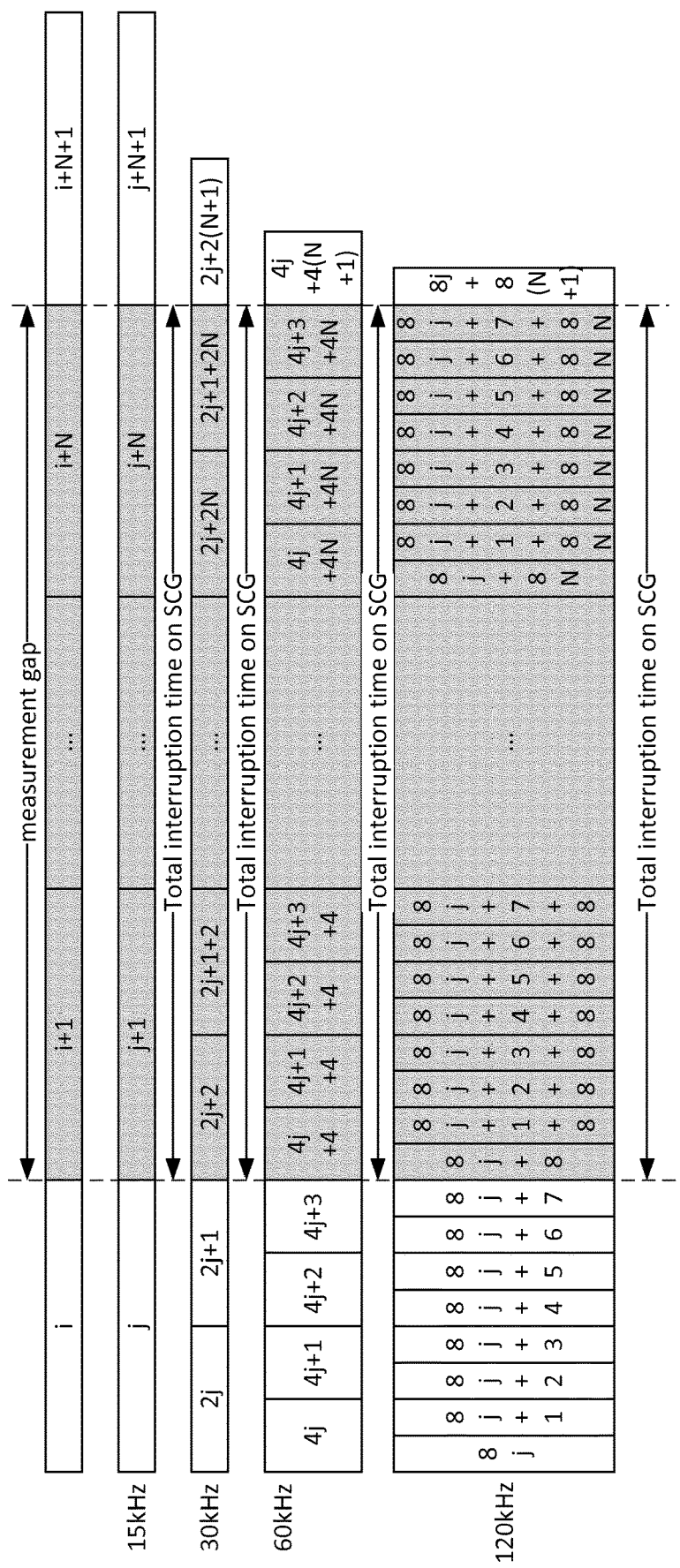
FIGS. 12A through 12D are reproductions FIG. 9.1.2-1 (a), FIG. 9.1.2-1(b), FIG. 9.1.2-1(c), and FIG. 9.1.2-1(d) of 3GPP Technical Specification (TS) 38.133 V 15.3.0, respectively.

FIG. 9.1.2-1(a) as contained in 3GPP TS 38.133 v 15.3.0 is reproduced as FIG. 12A.

Figure 12B:
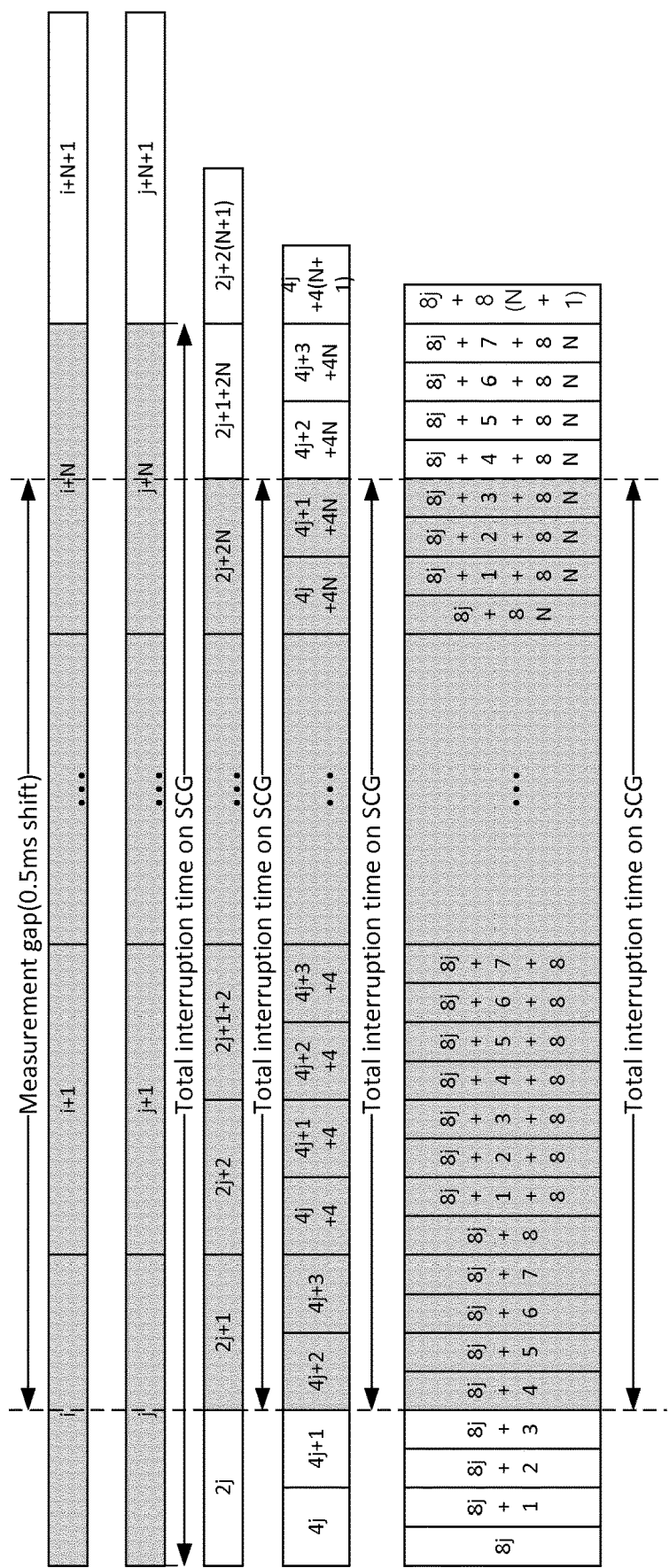

(a) Measurement gap with MGL=N (ms) with MG timing advance of 0ms for synchronous EN-DC and NR carrier aggregation FIG. 9.1.2-1(b) as contained in 3GPP TS 38.133 v 15.3.0 is reproduced as FIG. 12B.

Figure 12C:
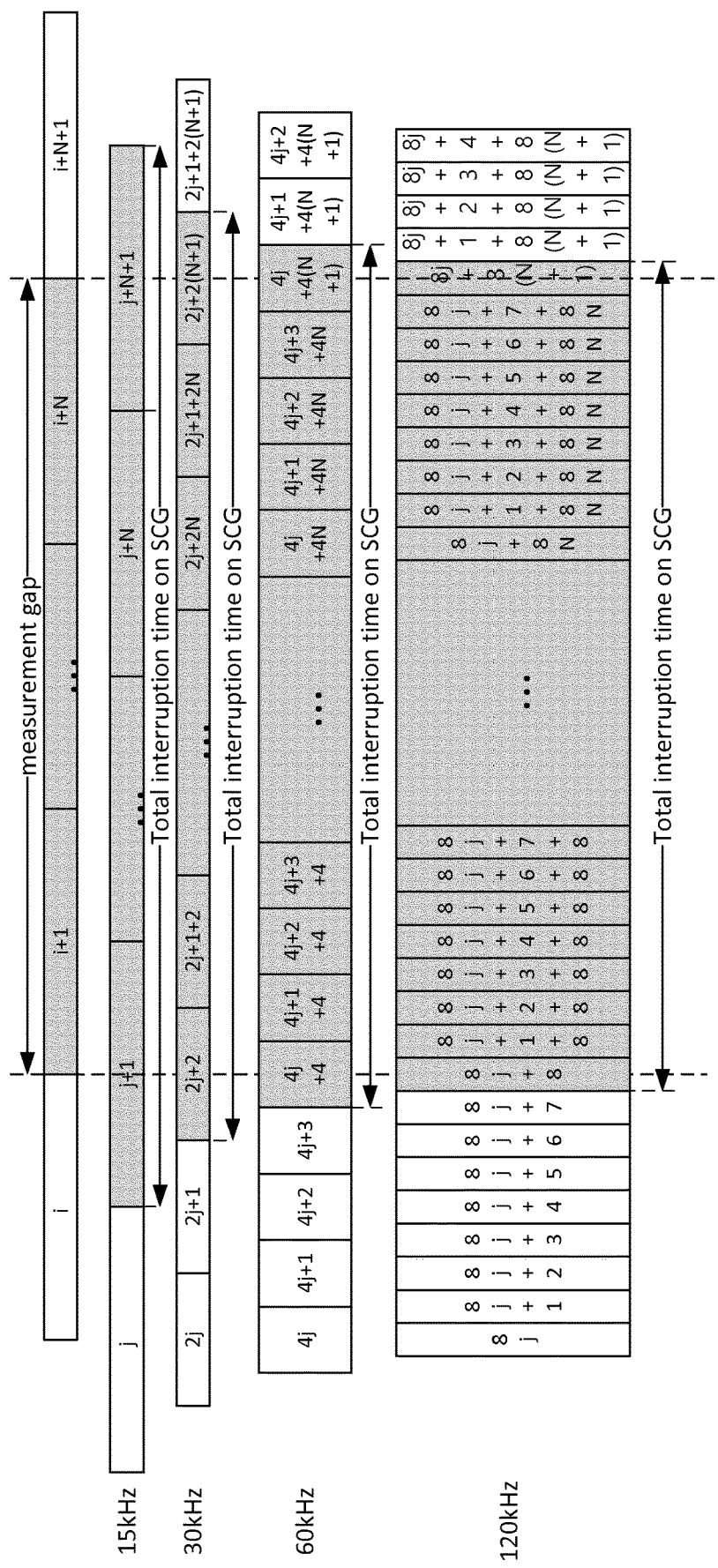

(b) Measurement gap with MGL=N (ms) with MG timing advance of 0.5 ms for synchronous EN-DC FIG. 9.1.2-1(c) as contained in 3GPP TS 38.133 v 15.3.0 is reproduced as FIG. 12C.

Figure 12D:
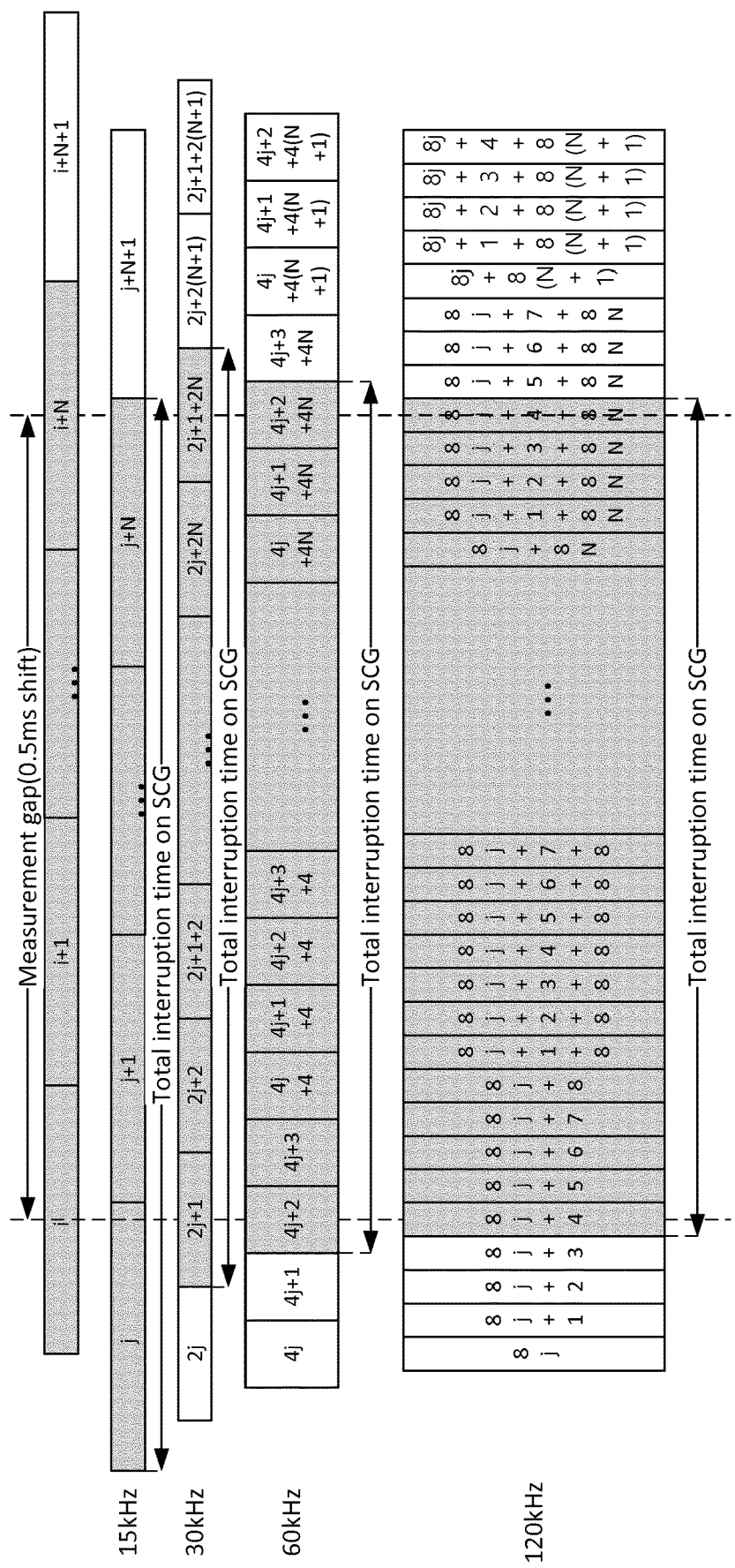

(c) Measurement gap with MGL=N (ms) with MG timing advance of 0ms for asynchronous EN-DC and NR carrier aggregation FIG. 9.1.2-1(d) as contained in 3GPP TS 38.133 v 15.3.0 is reproduced as FIG. 12D.

(d) Measurement gap with MGL=N (ms) with MG timing advance of 0.5 ms for asynchronous EN-DC FIGS. 12A-12D Depict Measurement GAP and Total Interruption Time on Serving Cells for EN-DC and NR Carrier Aggregation The corresponding total number of interrupted slots on serving cells during MGL is listed in Table 9.1.2-4 and Table 9.1.2-4a for synchronous EN-DC and NR carrier aggregation, and asynchronous EN-DC respectively.

TABLE 9.1.2-4

Total number of interrupted slots on serving cells during MGL for Synchronous EN-DC and NR carrier aggregation with per-UE measurement gap or per-FR measurement gap for FR1

| | Total number of interrupted slots on serving cells | | | | | |
|---|---|---|---|---|---|---|
| NR SCS | When MG timing advance of 0 ms is applied | | | When MG timing advance of 0.5 ms is applied | | |
| (kHz) | MGL = 6 ms | MGL = 4 ms | MGL = 3 ms | MGL = 6 ms | MGL = 4 ms | MGL = 3 ms |
| 15 | 6 | 4 | 3 | 7 | 5 | 4 |
| 30 | 12 | 8 | 6 | 12 | 8 | 6 |
| 60 | 24 | 16 | 12 | 24 | 16 | 12 |
| 120 | 48 | 32 | 24 | 48 | 32 | 24 |

Note1:
For Gap Pattern ID 0, 1, 2 and 3, total number of interrupted subframes on MCG is MGL subframes when MG timing advance of 0 ms is applied, and (MGL + 1) subframes when MG timing advance of 0.5 ms is applied.

Note2:
NR SCS of 120 kHz is only applicable to the case with per-UE measurement gap.

TABLE 9.1.2-4a

Total number of interrupted slots on serving cells during MGL forAsynchronous EN-DC with per-UE measurement gap or per-FR measurement gap for FR1 slots on serving cells

| | Total number of interrupted slots on serving cells | | | | | |
|---|---|---|---|---|---|---|
| NR SCS | When MG timing advance of 0 ms is applied | | | When MG timing advance of 0.5 ms is applied | | |
| (kHz) | MGL = 6 ms | MGL = 4 ms | MGL = 3 ms | MGL = 6 ms | MGL = 4 ms | MGL = 3 ms |
| 15 | 7 | 5 | 4 | 7 | 5 | 4 |
| 30 | 13 | 9 | 7 | 13 | 9 | 7 |
| 60 | 25 | 17 | 13 | 25 | 17 | 13 |
| 120 | 49 | 33 | 25 | 49 | 33 | 25 |

Note1:
For Gap Pattern ID 0, 1, 2 and 3, total number of interrupted subframes on MCG is MGL subframes when MG timing advance of 0 ms is applied, and (MGL + 1) subframes when MG timing advance of 0.5 ms is applied.

Note2:
NR SCS of 120 kHz is only applicable to the case with per-UE measurement gap.

In case that UE capable of per-FR measurement gap is configured with per-FR measurement gap for FR2 serving cells, total number of interrupted slots on FR2 serving cells during MGL is listed in Table 9.1.2-4b.

TABLE 9.1.2-4b

Total number of interrupted slots on FR2 serving cells during MGL for EN-DC and NR carrier aggregation with per-FR measurement gap for FR2

| | Total number of interrupted slots on FR2 serving cells | | | | | |
|---|---|---|---|---|---|---|
| NR SCS | When MG timing advance of 0 ms is applied | | | When MG timing advance of 0.25 ms is applied | | |
| (kHz) | MGL = 5.5 ms | MGL = 3.5 ms | MGL = 1.5 ms | MGL = 5.5 ms | MGL = 3.5 ms | MGL = 1.5 ms |
| 60 | 22 | 14 | 6 | 22 | 14 | 6 |
| 120 | 44 | 28 | 12 | 44 | 28 | 12 |

Measurement gap sharing shall be applies when UE requires measurement gaps to identify and measure intra-frequency cells or when SMTC configured for intra-frequency measurement are fully overlapping with measurement gaps, and when UE is configured to identify and measure cells on inter-frequency carriers and inter-RAT carriers. When network signals "01", "10" or "11", where X is a signalled RRC parameter TBD and is defined as in Table 9.1.2-5, the performance of intra-frequency measurements with no measurement gaps as specified in section 9.2.5, when SMTC configured for intra-frequency measurement are fully overlapping with measurement gaps, shall consider the factor $K_{intra}=1/X*100$, the performance of intra-frequency measurements with measurement gaps as specified in section 9.2.6 shall consider the factor $K_{intra}=1/X*100$, the performance of inter-frequency measurement as specified in section 9.3 and the performance of inter-RAT measurement as specified in section 9.4 shall consider the factor $K_{inter}=1/(100-X)*100$, When network signals "00" indicating equal splitting gap sharing, X is not applied and the performance of intra-frequency measurements as specified in section 9.2.5 and section 9.2.6, the performance of inter-frequency measurement as specified in section 9.3 and the performance of inter-RAT measurement as specified in section 9.4 are FFS.

TABLE 9.1.2-5

| Value of parameter X | |
|---|---|
| Network signaling ParameterName (to be determined by RAN2) | Value of X (%) |
| '00' | Equal splitting |
| '01' | 25 |
| '10' | 50 |
| '11' | 75 |

End of First Change

Unchanged Sections Omitted

The following description provides a description of the justification and benefits of some aspects of the present disclosure.

At the 3GPP meeting RAN4 #88, a WF (R4-1811869 "Way forward on UE behavior before or after measurement gap," ZTE) [1] on UE behaviour before and after a measurement gap was agreed, where companies are encouraged provide analyses on the following aspects:

UE behaviour before and after measurement gap, when MGTA 0 ms is applied
 NR TDD
 NR FDD
 NR CA with different SCS on different Secondary Cells (SCells)
UE behaviour before and after measurement gap, when MGTA 0.5 and 0.25 ms is applied for FR 1 (FR1) and FR2, respectively
 NR TDD
 NR FDD
 NR CA with different SCS on different SCells In this discussion, we are providing justification for a UE behavior around measurement gaps where also partially overlapped slots can be utilized by the network when scheduling the UE.

In E-UTRA legacy, both for baseline E-UTRA and later introduction of Short Transmit Time Interval (sTTI), the UE behavior around measurement gaps was based on that if any part, ever so little, of the subframe was overlapped by the measurement gap, the whole subframe is discarded for reception and/or transmission. This is based on that in baseline E-UTRA, downlink control signalling on PDCCH is confined to the symbols at the beginning of the slot, and the rest of the symbols being used for allocating data on PDSCH to users in a frequency division manner only, i.e., the time domain allocation for a user fills the whole subframe. The same goes for allocating data on PUSCH. Hence if missing parts of the subframe, decoding of control information, and/or data would in general fail.

In NR, the situation is different. Particularly, downlink control signalling can be transmitted in different and alternative time domain allocations within a slot, and thus is not confined to the beginning of the slot. Time domain allocations for PDSCH and PUSCH are flexible both with respect to starting symbol and length, and up to sixteen (16) different configurations can be configured at once. DM-RSs are front-loaded, but do not extend beyond the last allocated OFDM symbol in the allocation. Time between reception of DCI and the actual allocation on downlink or uplink is configurable and allows for up to thirty two (32) slots between the first and the latter. Downlink HARQ feedback time is configurable and thus allows for using different times between reception on PDSCH and ACK/NACK feedback on uplink for different situations.

Limiting the UE to discard reception and/or transmission in slots that are partially overlapped by measurement gaps is in our view too restrictive and would harm the system performance with respect to latency, achievable UE throughput (fewer scheduling opportunities), and system throughput (caused, e.g., by increased latency for mobility-related RRC signalling). Depending on the numerology in use, there are opportunities, e.g., for uplink transmission in partially overlapped slots before and after a measurement gap, as PUSCH allocations with appropriate time domain resource allocation can be provided well ahead in time. Similarly, there are opportunities for downlink reception in partially overlapped slots as for some numerologies and measurement gap lengths, HARQ feedback can be configured to be provided after the measurement gap. Moreover, PDCCH can be flexibly deployed with respect to time domain resource allocations within the slot, with the possibility of pointing out alternative monitored positions.

In an FDD NR cell with SCS 15 kHz, assuming a Measurement Gap Repetition Period (MGRP) of 20 ms, a Measurement Gap Length (MGL) of 6 ms, and MGTA of 0.5 ms, the difference between having the UE utilizing partially overlapped slots makes a difference of 17% in scheduling opportunities on downlink, and may amount to the same on uplink depending on how large the TA is. To fully utilize those additional scheduling opportunities will require that the network provides the proper RRC and MAC configurations to the UE. Although this brings complexity to the network scheduler implementation, we do not see any reason for introducing limitations on the UE behaviour that would rule out such network optimizations. Although the first network scheduler implementations may use rudimentary scheduling and avoid using the partially overlapped slots, later implementations will most likely optimize the system performance to unleash the full power of NR.

Observation 1: An increase in scheduling opportunities of up to 17% is achieved by allowing the UE to receive and/or transmit in partially overlapped slots at the beginning and end of measurement gaps.

Hence the following UE behavior is proposed in slots that are partially overlapped by measurement gap. (Note that the definition of gap start and gap end is under another agenda item.)

In a slot (or applicable part of a slot if TDD special slot format) that is partially overlapped by measurement gap:

If it is a PDCCH monitoring occasion, and provided that at least one monitored position of the CORESET as well as PDCCH DM-RS are comprised in the non-overlapped part of the slot, the UE attempts to decode PDCCH.

If a DCI carries a downlink allocation for the slot, and the PDSCH time domain resource allocation as well as the PDSCH DM-RS are comprised in the non-overlapped part of the slot, the UE receives and attempts to decode PDSCH.

If a DCI carries an uplink allocation for the slot, and the PUSCH time domain resource allocation as well as PUSCH DM-RS are comprised in the non-overlapped part of the slot, the UE transmits on PUSCH.

. . .

Proposal 1: In a slot that is partially overlapped by a measurement gap, the UE shall carry out actions associated with reception and/or transmission of channels and signals whose time domain resource allocations are comprised in the non-overlapped part of the slot.

Some example embodiments of the present disclosure are as follows:

GROUP A EMBODIMENTS

Embodiment 1: A method performed by a wireless device for scheduling communications operations for a serving cell, the method comprising: determining a communication slot associated with the serving cell which is partially overlapped by a measurement gap; identifying a scheduled operational task which can be carried out in a portion of the communication slot not overlapped by the measurement gap; and performing the scheduled operational task in the portion of the communication slot not overlapped by the measurement gap.

Embodiment 2: The method of embodiment 1, wherein determining the communications slot comprises: determining a set of measurement gap locations for an uplink and/or downlink of the serving cell; and determining a set of communications slots which are overlapped by at least one of the set of measurement gaps.

Embodiment 3: The method of embodiment 2, further comprising determining the set of communications slots which are overlapped by at least one of the set of measurement gaps based on a duplex mode and/or a slot pattern of the serving cell.

Embodiment 4: The method of embodiment 1, wherein: the serving cell is configured in Time Division Duplexing (TDD); and the method further comprises determining the communication slot of the serving cell which is partially overlapped by the measurement gap based on whether the TDD configuration for the communication slot is uplink, downlink, or flexible.

Embodiment 5: The method of embodiment 1, wherein determining the measurement gap is based on a measurement gap configuration and a protocol established for the serving cell by a base station.

Embodiment 6: The method of embodiment 5, further comprising: receiving the measurement gap configuration; determining a timing reference used for the measurement gap configuration on a carrier associated with the serving cell; determining, a set of communication slots partially overlapped by the measurement gap based on the timing reference; and determining, for each of the set of communication slots partially overlapped by the measurement gap, the portion of the communication slot not overlapped by the measurement gap.

Embodiment 7: The method of embodiment 6, further comprising identifying, for each of the set of communication slots partially overlapped by the measurement gap, the scheduled operational task which can be carried out in the portion of the communication slot not overlapped by the measurement gap.

GROUP B EMBODIMENTS

Embodiment 8: A method performed by a base station for scheduling communications operations for a serving cell, the method comprising: determining that a User Equipment (UE) associated with the serving cell is to be configured with measurement gap(s); determining communication slot(s) partially overlapped by the measurement gap(s); and facilitating scheduling of an operational task in a portion of the communication slot(s) not overlapped by the measurement gap(s).

Embodiment 9: The method of embodiment 8, further comprising: determining, based on numerology in use (e.g., Subcarrier Spacing (SCS), slot length, etc.) in the serving cell and/or a measurement gap configuration, the communication slot(s) partially overlapped by the measurement gap(s) for the UE on downlink; and determine a portion of the communication slot(s) which will be non-overlapped by the measurement gap(s) (e.g., before and after gap(s)).

Embodiment 10: The method of any of embodiments 9, wherein the measurement gap configuration comprises a Measurement Gap Timing Advance (MGTA).

Embodiment 11: The method of any of embodiments 8-10, further comprising adjusting, via Radio Resource Control (RRC) signaling, a set of monitored Physical Downlink Control Channel (PDCCH) time domain instants and/or Physical Downlink Shared Channel (PDSCH) time domain resource allocations, such that at least a subset of partially overlapped slots can be utilized for scheduling on downlink.

Embodiment 12: The method of any of embodiments 8-11, further comprising: determining, based on numerology (e.g., SCS, slot length, etc.) in use in the serving cell, measurement gap configuration, and/or uplink-downlink Timing Advance (TA) for the UE, whether the partially overlapped communication slot(s) will arise on uplink; and determining a portion of the communication slot(s) which will be non-overlapped by the measurement gap (e.g., before and after gap).

Embodiment 13: The method of any of embodiments 8-12, further comprising adjusting, via RRC signaling, a set of Physical Uplink Shared Channel (PUSCH) time domain resource allocations, such that at least a subset of partially overlapped slots can be utilized for scheduling on uplink.

Embodiment 14: The method of any of embodiments 8-13, further comprising adjusting, via RRC signaling, time domain resources for Sounding Reference Signal (SRS).

Embodiment 15: The method of any of embodiments 8-14, further comprising adjusting, via RRC signaling, time domain resources used for at least one format of Physical Uplink Control Channel (PUCCH).

Embodiment 16: The method of any of embodiments 8-15, further comprising scheduling the UE in the partially overlapped slot(s), with time domain resource allocation configurations that have been prepared for the same.

GROUP C EMBODIMENTS

Embodiment 17: A wireless device for scheduling communications operations for a serving cell, the wireless device comprising: processing circuitry configured to perform any of the steps of any of the Group A embodiments; and power supply circuitry configured to supply power to the wireless device.

Embodiment 18: A base station for scheduling communications operations for a serving cell, the base station comprising: processing circuitry configured to perform any of the steps of any of the Group B embodiments; and power supply circuitry configured to supply power to the base station.

Embodiment 19: A User Equipment, UE, for scheduling communications operations for a serving cell, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Those skilled in the art will recognize improvements and modifications to the embodiments of the present disclosure. All such improvements and modifications are considered within the scope of the concepts disclosed herein.

REFERENCES

[1] R4-1811869 "Way forward on UE behavior before or after measurement gap," ZTE
[2] R4-1813428 "DraftCR 38.133 UE behavior before and after measurement gap," Ericsson

What is claimed is:

1. A method performed by a wireless device for performing scheduled communications operations for a serving cell of the wireless device, the method comprising:
   determining a communication slot that is partially overlapped by a measurement gap, the communication slot being associated with the serving cell of the wireless device;
   identifying a scheduled operational task which can be carried out in a non-overlapped portion of the communication slot, the identifying being based on the size of the non-overlapped portion of the communication slot and the non-overlapped portion of the communication slot being a portion of the communication slot not overlapped by the measurement gap, the scheduled operational task being an operational task associated with a Physical Downlink Control Channel (PDCCH) monitoring, and the identifying comprising:
      determining that there is at least one PDCCH monitoring position configured for the wireless device that fits within the non-overlapped portion of the communication slot; and
      determining that a reference signal needed for demodulation of a PDCCH is available in the non-overlapped portion of the communication slot; and
   performing the scheduled operational task in the non-overlapped portion of the communication slot.

2. The method of claim 1, wherein determining the communication slot that is partially overlapped by the measurement gap comprises determining the communication slot that is partially overlapped by the measurement gap based on a measurement gap configuration of the wireless device, a subcarrier spacing of a carrier associated with the serving cell, and a measurement gap timing advance configured for the carrier associated with the serving cell.

3. The method of claim 1, wherein determining the communication slot that is partially overlapped by the measurement gap comprises determining, for a carrier associated with the serving cell, that there are one or more communication slots that are partially overlapped by the measurement gap based on a subcarrier spacing of the carrier associated with the serving cell and a measurement gap timing advance configured for the carrier associated with the serving cell.

4. The method of claim 1, further comprising determining a location of the measurement gap.

5. The method of claim 4, wherein determining the location of the measurement gap comprises determining a timing reference used for definition of the measurement gap on a carrier associated with the serving cell.

6. The method of claim 1, wherein performing the scheduled operational task comprises one of:

transmitting one or more signals in at least the non-overlapped portion of the communication slot;
receiving one or more signals in at least the non-overlapped portion of the communication slot;
transmitting one or more signals in at least the non-overlapped portion of the communication slot, provided that at least one symbol in the non-overlapped portion of the communication slot comprises a reference signal;
receiving one or more signals in at least the non-overlapped portion of the communication slot, provided that at least one symbol in the non-overlapped portion of the communication slot comprises a reference signal;
transmitting one or more signals in at least the non-overlapped portion of the communication slot, provided that the one or more signals are associated with a given priority, criticality, or both;
receiving one or more signals in at least the non-overlapped portion of the communication slot, provided that the one or more signals are associated with a given priority, criticality, or both;
transmitting one or more signals in at least the non-overlapped portion of the communication slot, provided that a length of the non-overlapped portion of the communication slot is above a given threshold;
receiving one or more signals in at least the non-overlapped portion of the communication slot, provided that a length of the non-overlapped portion of the communication slot is above a given threshold;
transmitting one or more signals in at least the non-overlapped portion of the communication slot, provided that the one or more signals are associated with a given numerology;
receiving one or more signals in at least the non-overlapped portion of the communication slot, provided that the one or more signals are associated with a given numerology;
transmitting one or more signals in at least the non-overlapped portion of the communication slot, provided that the one or more signals are associated with a given frequency range;
receiving one or more signals in at least the non-overlapped portion of the communication slot, provided that the one or more signals are associated with a given frequency range;
transmitting one or more signals in at least the non-overlapped portion of the communication slot, provided that the one or more signals are associated with a given transmission; and
receiving one or more signals in at least the non-overlapped portion of the communication slot, provided that the one or more signals are associated with a given transmission.

7. A wireless device for performing scheduled communications operations for a serving cell of the wireless device, the wireless device comprising:
a radio interface; and
processing circuitry associated with the radio interface, the processing circuitry configured to cause the wireless device to perform:
determining a communication slot that is partially overlapped by a measurement gap, the communication slot being associated with the serving cell of the wireless device;
identifying a scheduled operational task which can be carried out in a non-overlapped portion of the communication slot, the identifying being based on the size of the non-overlapped portion of the communication slot and the non-overlapped portion of the communication slot being a portion of the communication slot not overlapped by the measurement gap, the scheduled operational task being an operational task associated with a Physical Downlink Control Channel (PDCCH) monitoring, and the identifying comprising:
determining that there is at least one PDCCH monitoring position configured for the wireless device that fits within the non-overlapped portion of the communication slot; and
determining that a reference signal needed for demodulation of a PDCCH is available in the non-overlapped portion of the communication slot; and
performing the scheduled operational task in the non-overlapped portion of the communication slot.

8. A method performed by a network node for scheduling communications operations for a serving cell of a wireless device, the method comprising:
determining that the wireless device associated with the serving cell is to be configured with a measurement gap;
determining a communication slot that is partially overlapped by the measurement gap;
scheduling of an operational task for the wireless device in a portion of the communication slot that is not overlapped by the measurement gap, the scheduled operational task being an operational task associated with a Physical Downlink Control Channel (PDCCH) monitoring;
configuring at least one PDCCH monitoring position for the wireless device that fits within the non-overlapped portion of the communication slot; and
providing a reference signal needed for demodulation of a PDCCH by the wireless device in the non-overlapped portion of the communication slot.

9. The method of claim 8, wherein determining the communication slot that is partially overlapped by the measurement gap comprises determining the communication slot that is partially overlapped by the measurement gap based on a subcarrier spacing used for a carrier associated with the serving cell and a measurement gap timing advance configured for the wireless device.

10. The method of claim 8, wherein scheduling of the operational task in the portion of the communication slot that is not overlapped by the measurement gap comprises adjusting at least a set of monitored PDCCH time domain instants, such that the portion of the communication slot that is not overlapped by the measurement gap can be utilized for scheduling on downlink.

11. The method of claim 8, wherein scheduling of the operational task in the portion of the communication slot that is not overlapped by the measurement gap comprises scheduling the wireless device in the portion of the communication slot that is not overlapped by the measurement gap.

12. A network node for scheduling communications operations for a serving cell of a wireless device, the network node comprising:
a radio interface; and
processing circuitry associated with the radio interface, the processing circuitry configured to cause the network node to perform:
determining that the wireless device associated with the serving cell is to be configured with a measurement gap;

determining a communication slot that is partially overlapped by the measurement gap;

scheduling of an operational task for the wireless device in a portion of the communication slot that is not overlapped by the measurement gap, the scheduled operational task being an operational task associated with a Physical Downlink Control Channel (PDCCH) monitoring;

configuring at least one PDCCH monitoring position for the wireless device that fits within the non-overlapped portion of the communication slot; and providing a reference signal needed for demodulation of a PDCCH by the wireless device in the non-overlapped portion of the communication slot.

* * * * *

UNITED STATES PATENT AND TRADEMARK OFFICE
CERTIFICATE OF CORRECTION

PATENT NO. : 12,185,289 B2  
APPLICATION NO. : 17/280995  
DATED : December 31, 2024  
INVENTOR(S) : Axmon et al.

Page 1 of 1

It is certified that error appears in the above-identified patent and that said Letters Patent is hereby corrected as shown below:

In the Specification

In Column 35, Line 32, delete "$^{NOTE1}$:" and insert -- NOTE 1: --, therefor.

In Column 35, Line 34, delete "$^{NOTE2}$:" and insert -- NOTE 2: --, therefor.

In Column 35, Line 36, delete "$^{NOTE3}$:" and insert -- NOTE 3: --, therefor.

In Column 35, Line 37, delete "$^{NOTE4}$:" and insert -- NOTE 4: --, therefor.

In Column 35, Line 42, delete "Oms," and insert -- 0 ms, --, therefor.

In Column 35, Line 48, delete "E-UTRA/FR1I/FR2" and insert -- E-UTRA/FR1/FR2 --, therefor.

In Column 35, Line 55, delete "FRU/LTE" and insert -- FR1/LTE --, therefor.

In Column 35, Line 61, delete "FR" and insert -- FR1 --, therefor.

In Column 36, Line 18, delete "v0-11" and insert -- 0-11 --, therefor.

In Column 36, Line 29, delete "$^{NOTE1}$:" and insert -- NOTE 1: --, therefor.

In Column 36, Line 31, delete "$^{NOTE2}$:" and insert -- NOTE 2: --, therefor.

In Column 36, Line 34, delete "$^{NOTE3}$:" and insert -- NOTE 3: --, therefor.

In Column 36, Line 37, delete "$^{NOTE4}$:" and insert -- NOTE 4: --, therefor.

In Columns 37 & 38, In Table 9.1.2-4a, Line 3, delete "for FR1 slots on serving cells" and insert -- for FR1 --, therefor.

Signed and Sealed this  
Third Day of June, 2025

Coke Morgan Stewart  
*Acting Director of the United States Patent and Trademark Office*